United States Patent
Kondaveeti

(10) Patent No.: US 11,736,503 B2
(45) Date of Patent: Aug. 22, 2023

(54) DETECTION OF ANOMALOUS LATERAL MOVEMENT IN A COMPUTER NETWORK

(71) Applicant: salesforce.com, inc., San Francisco, CA (US)

(72) Inventor: Anirudh Kondaveeti, Redwood City, CA (US)

(73) Assignee: Salesforce, Inc., San Francisco, CA (US)

(*) Notice: Subject to any disclaimer, the term of this patent is extended or adjusted under 35 U.S.C. 154(b) by 153 days.

(21) Appl. No.: 17/013,209

(22) Filed: Sep. 4, 2020

(65) Prior Publication Data

US 2021/0120026 A1    Apr. 22, 2021

Related U.S. Application Data

(60) Provisional application No. 62/924,647, filed on Oct. 22, 2019.

(51) Int. Cl.
*H04L 29/06* (2006.01)
*H04L 9/40* (2022.01)

(52) U.S. Cl.
CPC ...... *H04L 63/1425* (2013.01); *H04L 63/0272* (2013.01)

(58) Field of Classification Search
CPC ............ H04L 63/1425; H04L 63/0272; H04L 63/168
See application file for complete search history.

(56) References Cited

U.S. PATENT DOCUMENTS

| | | | |
|---|---|---|---|
| 9,516,053 B1 * | 12/2016 | Muddu | ............... G06F 3/0484 |
| 9,727,723 B1 | 8/2017 | Kondaveeti et al. | |
| 9,942,252 B1 | 4/2018 | Kondaveeti et al. | |
| 10,313,390 B1 | 6/2019 | Kondaveeti et al. | |
| 10,430,721 B2 | 10/2019 | Yu et al. | |
| 10,560,364 B1 | 2/2020 | Kondaveeti et al. | |
| 2019/0387009 A1 | 12/2019 | Kondaveeti | |
| 2021/0037035 A1 * | 2/2021 | Graul | ................. H04L 63/1425 |
| 2022/0060509 A1 * | 2/2022 | Crabtree | ............ H04L 63/1441 |

* cited by examiner

*Primary Examiner* — William J. Goodchild
(74) *Attorney, Agent, or Firm* — Kowert, Hood, Munyon, Rankin & Goetzel, P.C.; Dean M. Munyon

(57) ABSTRACT

Various embodiments of methods for detecting anomalous activity in a computer network are disclosed. A method includes a computer system receiving an indication of a current session establishing a secure channel to a computing device within a network. The computer system evaluates information relating to the current session, as well as information relating to one or more other sessions. Using this information, the computing system performs monitoring to detect the presence of anomalous lateral movement within the network, for example based on detecting multiple user credentials. Based on the evaluating performed, the computer system generates a score for the current session and reports whether the score is indicative of anomalous lateral movement.

20 Claims, 21 Drawing Sheets

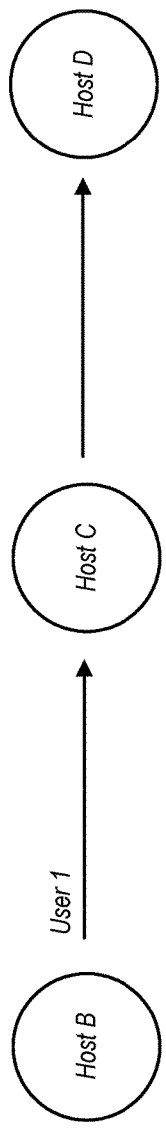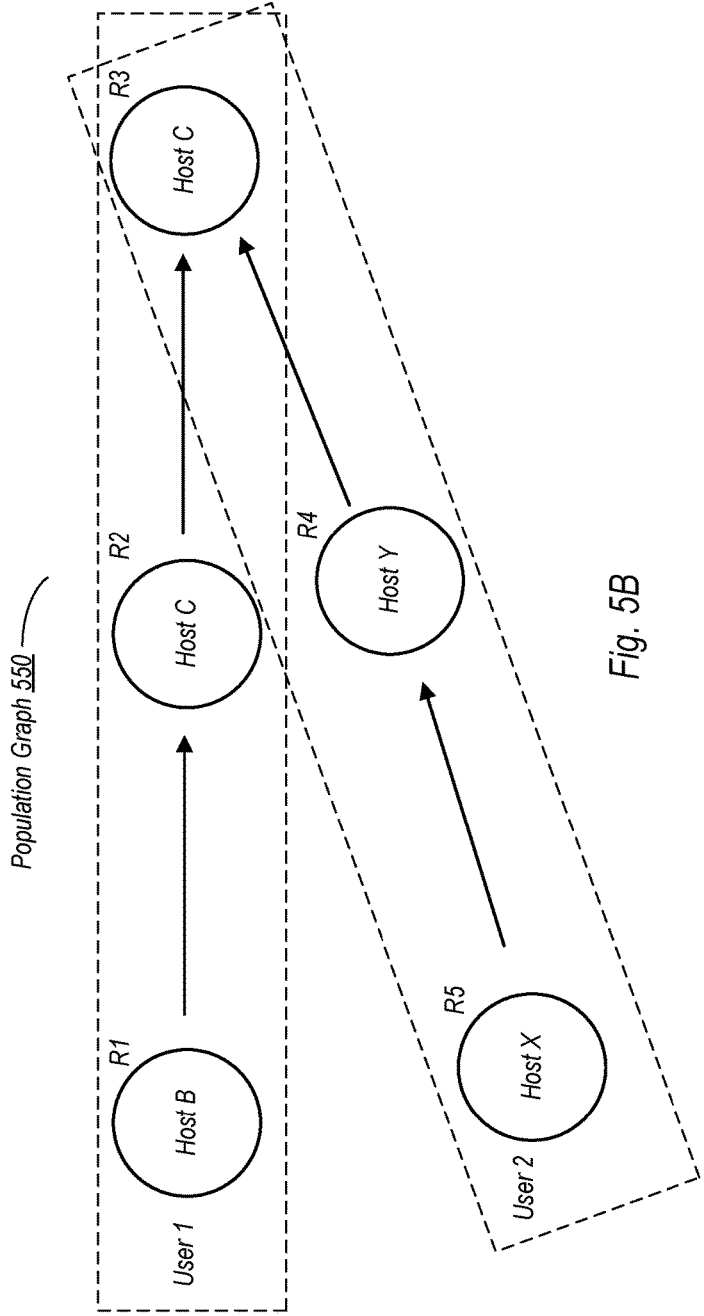

| User | Host Type | Time Range 1 | Time Range 2 | Time Range 3 | Time Range 4 |
|---|---|---|---|---|---|
| U1 | H1 | 12 | 13 | 0 | 0 |
| U2 | H1 | 13 | 12 | 0 | 0 |
| U3 | H1 | 0 | 0 | 25 | 26 |
| U4 | H1 | 0 | 0 | 24 | 24 |

User Cluster #1: U1, U2
User Cluster #2: U3, U4

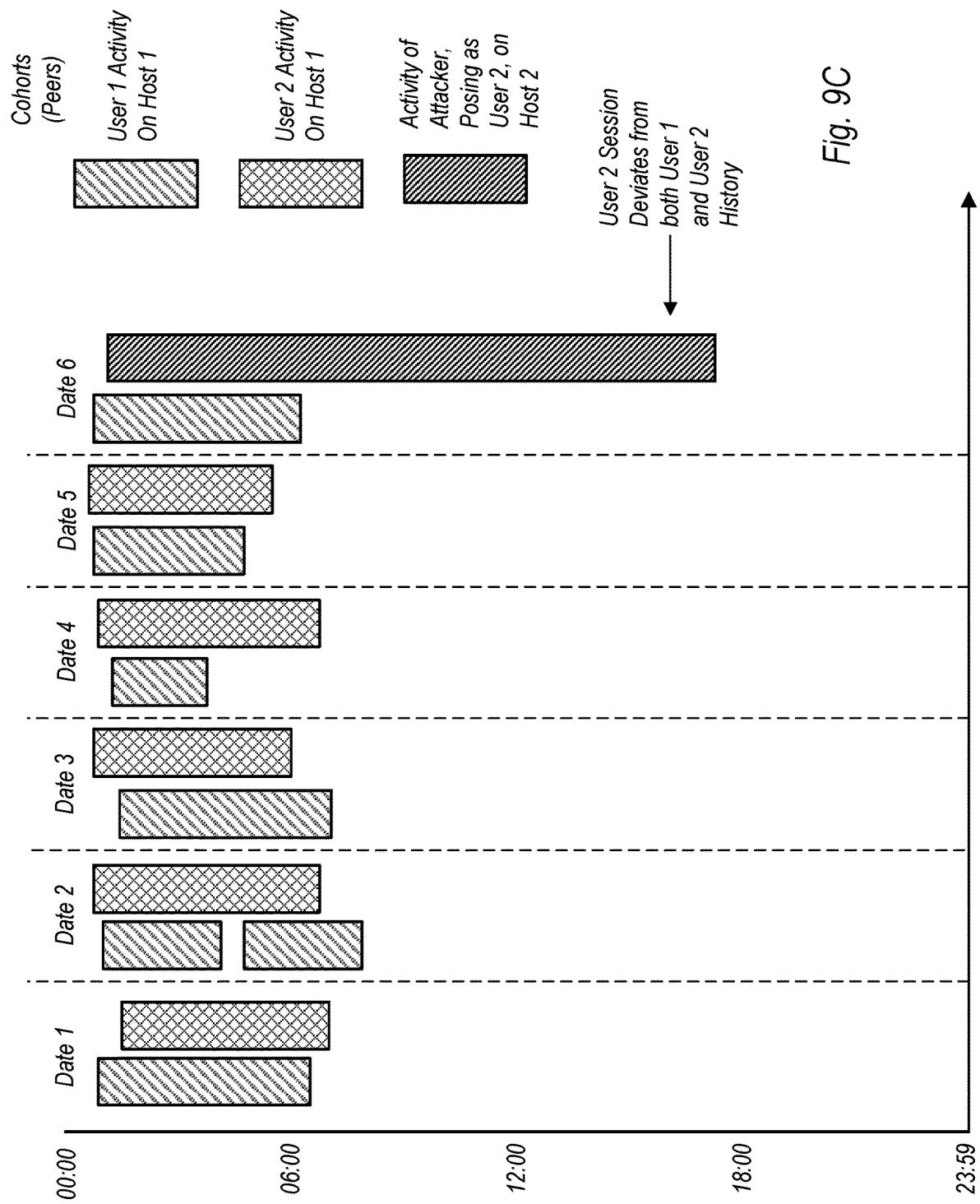

DETECTION OF ANOMALOUS LATERAL MOVEMENT IN A COMPUTER NETWORK

PRIORITY

This application claims priority to U.S. provisional patent application Ser. No. 62/924,647, entitled "Anomalous Activity Detection in a Computer Network," filed Oct. 22, 2019, which is hereby incorporated by reference in its entirety as though fully and completely set forth herein.

BACKGROUND

Technical Field

This disclosure is directed to network security, and more particularly, to detecting anomalous lateral movement in networks.

Description of the Related Art

Many organizations employ computer networks that enable both local and remote access by that organization. For remote network access, some sessions may be conducted over other networks that are not in and of themselves secure networks. To provide secure access to an organization's network over an otherwise unsecure network, various protocols may be utilized. These protocols may provide secure access to the organization's network through otherwise unsecure networks. For example, secure shell (SSH) is a cryptographic network protocol that provides secure access to network services over an unsecured network.

Despite the use of security protocols, networks may still at times be subject to access by malicious actors. Attackers of a network may use compromised user credentials and other tactics to obtain network access. Such attackers may also employ tactics to evade detection during an unauthorized access to a network. By obtaining unauthorized access and evading detection, an attacker may obtain protected information or may compromise a network in other ways (e.g., such as a distributed denial of service attack). In some cases, a malicious user may move "laterally" through a network, first gaining access to one host within the network and then moving to other hosts. This type of malicious activity may in some cases escape notice of individuals such as system administrators for months at a time.

BRIEF DESCRIPTION OF THE DRAWINGS

The following detailed description makes reference to the accompanying drawings, which are now briefly described.

FIG. 5A is an example of a user graph generated by one embodiment of a sub-model used for credential compromise detection.

FIG. 5B is an example of a population graph generated by one embodiment of a sub-model used for credential compromise detection.

FIG. 9A is a chart illustrating the grouping of users in one embodiment of a sub-model that detects anomalous lateral movement in a network based on peers of a particular user.

FIG. 9C is a diagram illustrating operation of one embodiment of a sub-model that detects anomalous lateral movement in a network based on peers of a particular user.

Figure 1:
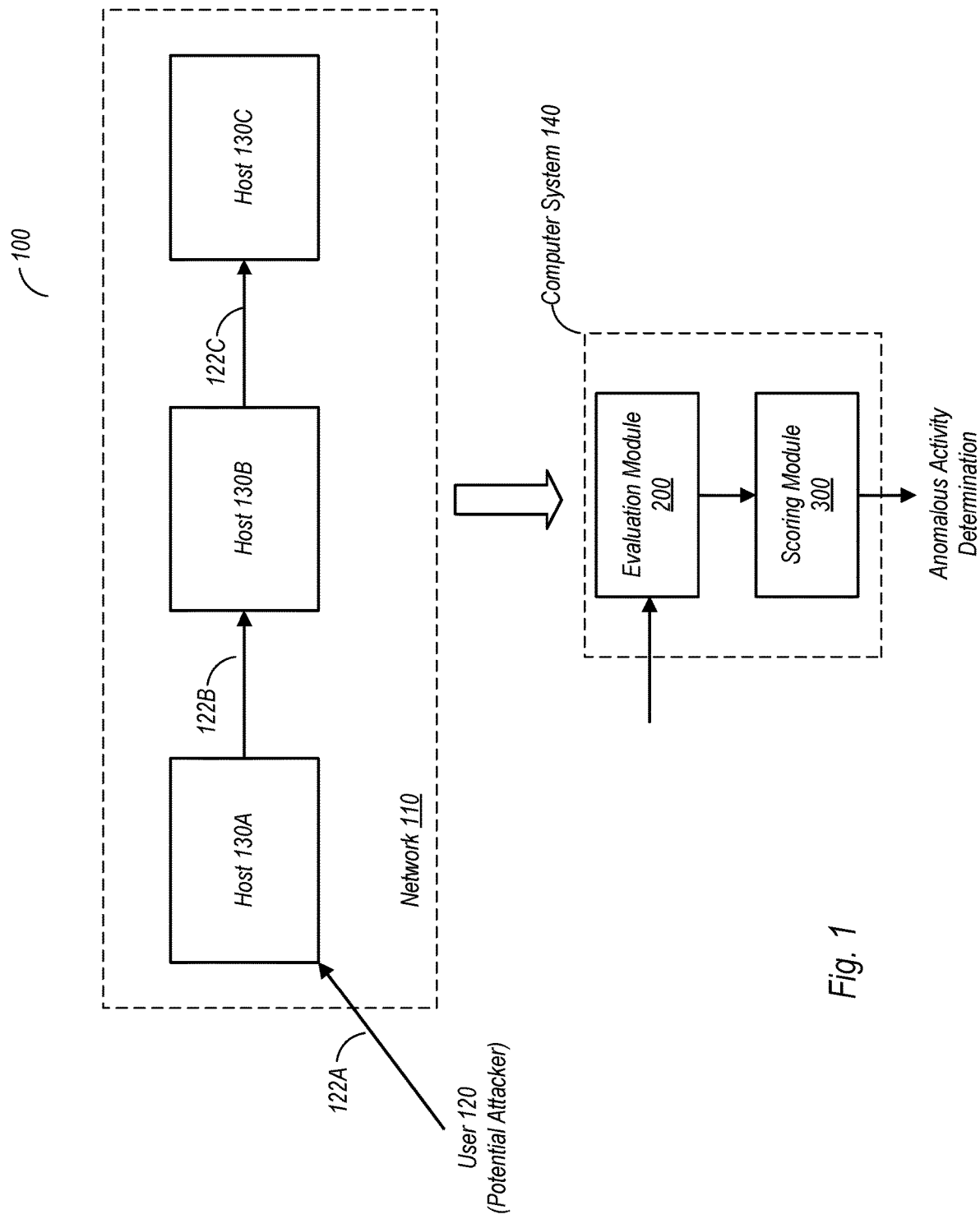
FIG. 1 is a block diagram of one embodiment of a network and a system for anomalous detecting lateral movement in the network.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination hereof.'

As used herein, the term "platform" refers to an environment that includes a set of resources that enables some functionality. (For example, in the context of the present disclosure, the functionality is automated decision making). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules," discussed below, are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, an automated decision-making platform according to the present disclosure provides resources for performing automated decision making; users may utilize the platform to actually carry out instances of automated decision making. Embodiments of the automated decision-making platform described herein thus enable the functionality of automated decision making to be performed.

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software and a hardware module.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to various techniques for detecting anomalous lateral movement in a network. Lateral movement in a network is a mechanism used by attackers of computer networks to progressively move through a network. This movement is said to be "lateral" in the sense that the attacker first gains entry at particular host within the network, and then uses that host a springboard to access another host within the network, and so on, all the while accessing potentially sensitive information. Further, the present disclosure attempts to detect "anomalous," as opposed to permissible lateral movement within a network. During anomalous lateral movement, an attacker may use credentials of multiple users to evade detection and spend a significant amount of time within a network, sometimes several months before being noticed. To date, however, detection of anomalous lateral movement has been time-consuming and difficult to ascertain.

The inventor has recognized that there are various factors that may be used to detect anomalous lateral movement within a network, particularly movement that occurs via a secure channel (e.g., a secure shell protocol such as SSH). These factors include session history associated with a particular user associated with the current session, history of peers of the users, timing of the session, as well as any combination of these factors. The evaluation may be performed by a computer system in the network that is able to access data about both current and past sessions for a number of users. One technique for detecting anomalous lateral movement within a network involves the generation of user and population graphs, as disclosed in U.S. patent application Ser. No. 16/011,487, which is assigned to the assignee of the present application and which has the same inventor as the present application. The present disclosure contemplates additional techniques that may be used to detect anomalous lateral movement. These additional techniques may be used as alternatives to the user/population graph methodology, or in conjunction therewith. Based on the evaluation of various ones of these factors, a determination regarding the likelihood of anomalous activity may be made. For example, this determination may take the form of a score. The score can then be used to assess activity within a current session relative to some threshold to determine whether anomalous lateral movement is occurring or is likely to be occurring.

A secure shell protocol is used herein according to its accepted meaning in the art, which includes a network protocol that gives users such as system administrators, a secure way to access a computer over an unsecured network. One secure shell protocol is SSH, which is commonly referred to as Secure Shell or Secure Socket Shell. In addition to providing secure network services, SSH may also refer to the suite of utilities that implement the SSH protocol.

Secure shell protocols typically provide strong password authentication and public key authentication, as well as encrypted data communications between two computers over an open network, such as the internet. In addition to providing strong encryption, SSH is widely used by network administrators for managing systems and applications remotely, enabling them to log in to another computer over a network, execute commands and move files from one computer to another.

As is understood in the art, secure shell programs were created to replace insecure terminal emulation or login programs, including Telnet, rlogin (remote login), rsh (remote shell), and also to replace file transfer programs such as File Transfer Protocol (FTP) and rcp (remote copy). Thus, while a "network session" as used herein can be established via a variety of programs (including using less secure and more secure protocols), a "secure network session" refers to sessions established via a secure shell protocol such as SSH.

SSH refers both to the cryptographic network protocol and to the suite of utilities that implement that protocol. SSH uses the client-server model, connecting a Secure Shell client application, which is the end where the session is displayed, with an SSH server, which is the end where the session runs. SSH implementations often include support for application protocols used for terminal emulation or file transfers. SSH can also be used to create secure tunnels for other application protocols, for example, to securely run X Window System graphical sessions remotely. An SSH server typically listens on the standard Transmission Control Protocol (TCP) port 22.

The most basic use of SSH is for connecting to a remote host for a terminal session. The form of that command is the following: ssh UserName@SSHserver.example.com. This command will cause the client to attempt to connect to the server named server.example.com, using the user ID UserName. If this is the first time negotiating a connection between the local host and the server, the user may be prompted with the remote host's public key fingerprint and prompted to connect, despite there having been no prior connection. Once an initial connection is established, the local system will store the host key in a local file (e.g., known hosts) that may be stored in a hidden directory in the user's home directory. Once the host key has been stored in the known hosts file, the client system can connect directly to that server again without need for any approvals; the host key authenticates the connection.

In various embodiments, the detecting of anomalous lateral movement includes running a machine learning model having a plurality of sub-models, each of which assesses different factors. The high-level model then uses the results of these sub-models to determine whether anomalous lateral movement is present. Inputs to the various sub-models may include session history for particular users (e.g., whose credentials are being used to gain access to the system), current session information, information regarding past and current session of other users, as well as information regarding a mechanism by which the current session was established with the network (e.g., Wi-Fi, virtual private network, or VPN, etc.). Each of the various sub-models may compute a score based on the various pieces of information input thereto. An aggregate score may then be produced based on a sum of the individual scores, and then compared to a threshold to assess malicious activity.

System for Detecting Lateral Movement:

FIG. 1 is a block diagram of one embodiment of a network and a system for anomalous detecting anomalous lateral movement in the network. In the embodiment shown, system 100 includes a simplified example of a network 110, which includes hosts 130A, 130B, and 130C. Network 110, and movement therein, may be monitored by computer system 140, which, in various embodiments, could also be a potential host system.

A session, such as a secure shell (SSH) session may be established using credentials supplied by user 120. In some cases, user 120 may either be a legitimate user, meaning the individual supplying the credentials actually corresponds to the supplied credentials. In other cases, user 120 may be a malicious individual or malware program using someone else's legitimate credentials. In the illustrated example, the credentials of user 120 are used to access the network, over path 122A, to host 130A. From host 130A, user 120 may access host 130B via path 122B. Subsequently, user 120 may access host 130C via path 122C.

The movement of user 120 through network 110 is monitored and evaluated by computer system 140 to determine whether this movement is legitimate or not. Computer system 140 includes an evaluation module 200 arranged to carry out the evaluation, using information regarding the current session associated with user 120, as well as past sessions. In one embodiment, computer system 140 may obtain a history by accessing an SSH session log for user 120. In addition to the information for user 120, information regarding other users of network 110, for both past and present sessions may also be obtained by evaluation module 200. As will be discussed in further detail below, evaluation module 200 may utilize a machine learning model to evaluate the current session of user 120, the machine learning model having a number of sub-models.

In some embodiments, evaluation information generated by evaluation module 200 may be forwarded to scoring module 300. Using this information, scoring module 300 may generate a score for the current session. The score used to make the determination may be an aggregate score based on individual scores for a number of different sub-models. These scores may be weighted in some embodiments. In various embodiments, the generated score may be compared to a threshold to make a determination as to whether anomalous lateral movement is occurring during the current session. The anomalous activity determination output by scoring module 300 may be used by, e.g., an administrator of network 110 to take any appropriate actions to ensure network security. In other instances, evaluation module 200 may simply make a binary determination based on all available inputs regarding whether the user's movement constitutes anomalous activity. In other instances, evaluation module 200 may classify the user's movement into one of three or more "bins" (e.g., a first bin indicating activity that is believed to be legitimate movement, a second bin indicating activity that is believed to be malicious, and a third bin indicating a middle ground of suspicious movement that may need further investigation).

Figure 2:
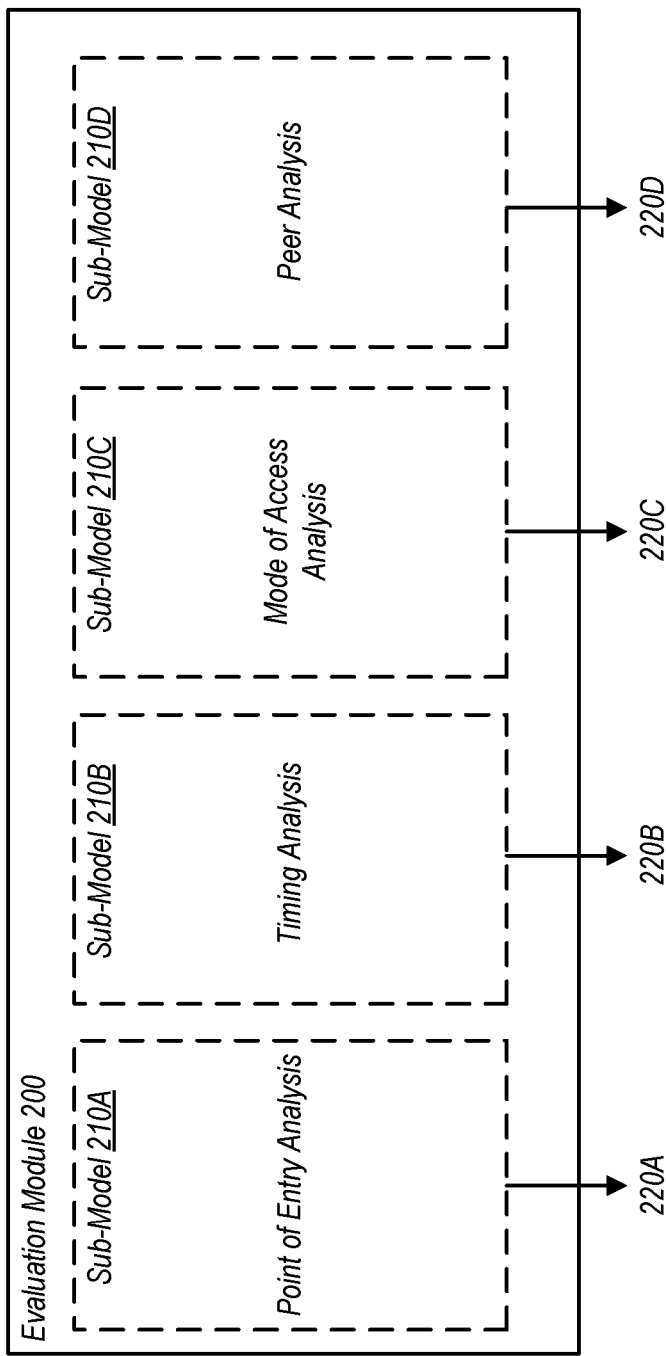
FIG. 2 is a flow diagram of one embodiment of an evaluation module used to detect the presence of anomalous lateral movement in a network.

FIG. 2 is a block diagram of one embodiment of an evaluation module 200. In the embodiment shown, evaluation module 200 implements a machine learning model having four different sub-models. These models will be briefly discussed now, and in further detail below.

Sub-model 210A in the embodiment shown is used for point-of-entry analysis. Alternatively, this sub-model may be referred to as a credential compromise detection sub-model. This model determines a point of entry into the network for the current session (e.g., the host within the network at which the session originated). An unusual point of entry into the network can be an indication that a user's credentials have been compromised, particularly when an attacker uses a first set of credentials to gain access to the network and subsequently, at a different host, switches to using a different set of credentials. As a result of the evaluation performed by sub-model 210A, a score 220A may be output therefrom.

Sub-model 210B is directed to timing analysis. More particularly, sub-model 210B may be used to determine if the timing is anomalous for a user associated with the current session relative to previous sessions by the same user. For example, if a particular user typically accesses between 8:00 AM and 6:00 PM in a particular time zone, an access between midnight and 3:00 AM in the same time zone may be flagged as anomalous timing. Although the main focus of sub-model 210B is the timing of the current session, some activity monitoring may also be performed. The activity performed during a current session may provide additional information to the determination of whether anomalous lateral movement is occurring. Sub-model 210B may output 220B as a result of the evaluation performed therein.

Sub-model 210C in the embodiment shown is directed to a mode-of-access analysis. The mode of access may be, among others, via WiFi, virtual private network (VPN). Other possible modes of access may also be considered as well, such as a desktop computer in a user's office directly connected by wire/cable to the network. Generally speaking, sub-model 210C seeks to consider the primary legitimate modes of access through which a session can be established with the network. If none of these possible modes are detected to have been used in establishing a current session, the score 220C output from sub-model 210C may indicate the same. Accordingly, an illegitimate mode of access for the embodiment discussed herein may be determined to be in progress if there is SSH activity while the indicated user is not connected to the network by VPN, WiFi, or a wired connection. More generally, a mode of access may be defined as such for various embodiments as any time a session (e.g., SSH session) is conducted without one of the modes of access that are defined as legitimate modes for that particular embodiment.

Sub-model 210D in the embodiment shown is directed to peer analysis. In particular, sub-model 210D may compare activities performed by a user associated with the current session with those identified as the user's peers. A "peer" of a user is determined by a one or more user groups that are accessible to evaluation module 200. Each of these user groups represents a type of user classification. For example, there may be a group for a particular office of a company, a particular department, a particular job title or function, a particular security clearance, experience level, and the like. Accordingly, users of network 110 can be said to be peers if they belong to a common user group as defined within the network. This definition may be accessible to software used by network administrators, for instance. As a specific example, a user may be a software engineer working at a specific location or within a specific department of an organization, while the user's peers may also be identified as software engineers working at the specific location/specific department. This type of classification may be useful based on the observation that users in particular user groups are likely to have some commonality in their network activity, including when they access the network, how they access the network, typical behavior once logged in to the network, the type of data accessed within the network, actions performed on that data, and so on. As such, the software engineer and those identified as the peers thereof may typically access certain hosts on their organization's network. The score 220D output from sub-model 210D may indicate detection of activities performed during the current session that are determined to be anomalous with respect to activities associated peers of the user associated with the session.

Figure 3:
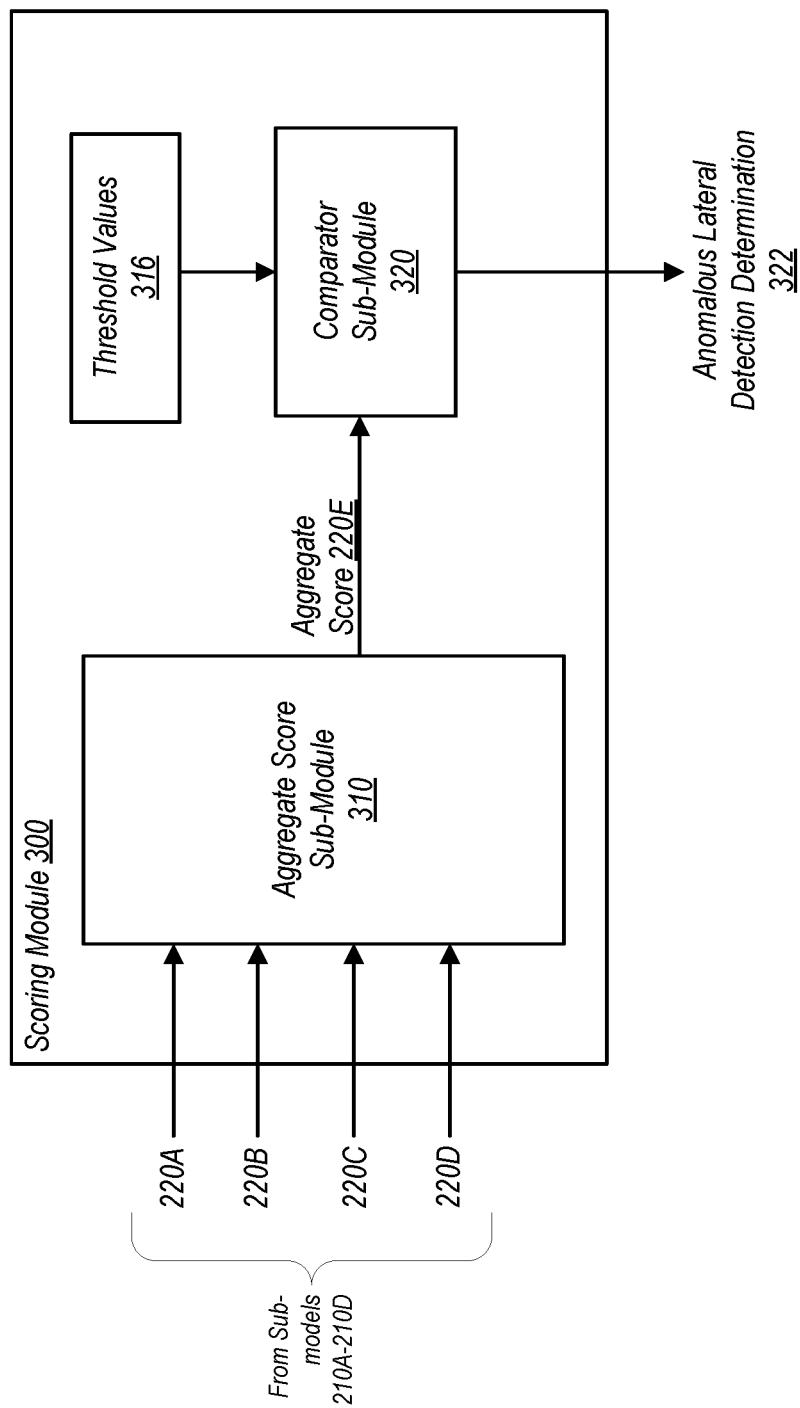
FIG. 3 is a block diagram of one embodiment of a scoring module used for scoring evaluations in the detection of anomalous lateral network movement.

FIG. 3 is a block diagram of one embodiment of scoring module 300. In the embodiment shown, aggregate score sub-module 310 is coupled to receive scores 220A, 220B, 220C, and 220D from sub-models 210A, 210B, 210C, and 210D, respectively. Aggregate score sub-module 310 may utilize the individual scores provided by each of the sub-models to determine an aggregate score 220E. Table 1 below illustrates the scoring functions carried out by one embodiment of aggregate score sub-module.

TABLE 1

| Activity | Score | Sub-Model |
| --- | --- | --- |
| User based in CA and Logs into Host 1 at 1 am PST | 20 | Timing Sub-Model |
| User session starts at Host 1 - Unusual Point of Entry | 20 | Credential Compromise |
| User VPN activity ended at 6 PM PST, no further VPN activity | 20 | Mode of Access |
| User Wired activity ended at 6 PM PST, no further Wired activity | 20 | Mode of Access |
| User's Job role is Architect, and other Architects (cohorts of user) do not login to Host 1 | 20 | Peer Analysis |

In the example of Table 1 above, a total risk score of 100 is generated based on the individual scores produced by the various sub-models. This score may be used by the comparator sub-module 320 to assess (e.g., by comparison with a threshold) whether anomalous lateral movement is occurring for the evaluated SSH session.

In generating aggregate score 220E, aggregate score sub-module 310 may apply weighting to the individual scores. For example, over time, aggregate score sub-module 310 may be update based on prediction history with regard to the detection of anomalous lateral movement within the network. Those sub-models that have been determined to have more predictive power in determining the occurrence with anomalous lateral movement in the network may be given a greater weight during the determination of aggregate score 220E.

Aggregate score 220E is provided to comparator sub-module 320 in the embodiment shown. Comparators sub-module 320 is also coupled to receive a threshold value 316, and perform a comparison with the received aggregate score 220E. Based on the comparison performed therein, comparator sub-module 320 outputs anomalous lateral detection determination 322. In one embodiment, this determination may be a binary indication as to whether the system has determined that anomalous lateral movement has been detected in the current session. Using this indication, a network administrator may perform appropriate actions, such as terminating the current session, or flagging it for manual review.

First Sub-Model—Point of Entry Analysis:

As discussed above, a first sub-model is used to detect anomalous lateral movement in a network by analyzing, for a particular current user session, a point of entry into the network. Suppose a user, during a current session, is accessing a particular computer system Z within network 110. The "point of entry" for the current session is the computer system that was originally used to enter the network from a site outside the network. The point of entry might be system Z, but could also be another system. For example, if system Z was accessed via system Y within the network, and system Y was accessed via system X within the network, the "point of entry" for the current session is system X.

The inventor has recognized that if there is an "unusual" (i.e., uncommon or little used) point of entry into the network for a current network session, this may indicate that the credentials for the user associated with the current session have been compromised. This sub-model thus determines a point of entry into the network for the current session and assesses the host computer corresponding to the point of entry—for example according to a ranking algorithm. In one embodiment, a ranking is assigned to various host computer system within the network. The ranking of the point-of-entry host can then be compared to a threshold to determine a likelihood that this factor indicates anomalous activity. In various embodiments, a lower ranking for a given host may indicate that it is not a "popular" point of entry, and thus indicate that it is an unlikely point of entry for establishing a legitimate network session.

The credentials of a particular user may be used by an attacker to establish an SSH session to a first host in the network, with a subsequent access to a second host. At the second host, the attacker may switch to the credentials of another user and establish a new session. After establishing this new session at the second host, the attacker may subsequently access a third host and a fourth host. The access at the second host may be performed at an unusual location in the network, such as at a server that is not normally used as a point of entry. This detection of an unusual point of entry may indicate, at minimum, that the credentials of the second user have been compromised (if not those of the first user as well).

Figure 4:
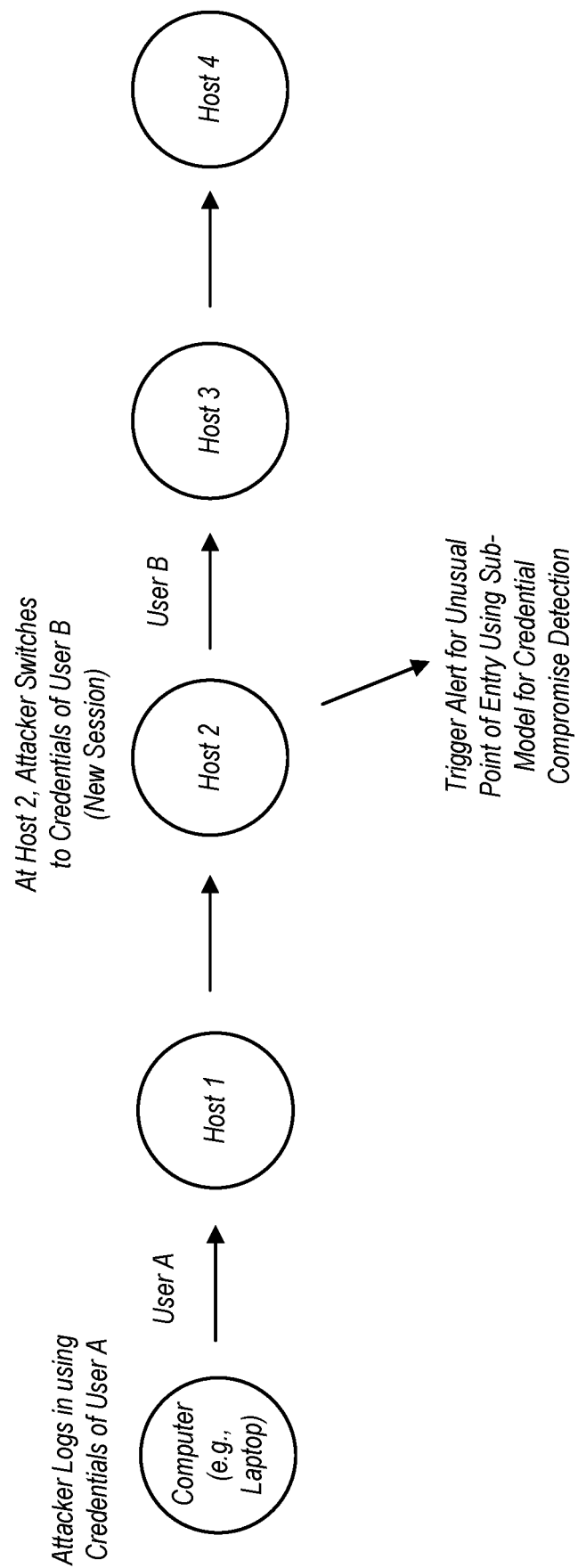
FIG. 4 is a diagram illustrating the detection of anomalous lateral movement in a network using one embodiment of a machine learning sub-model.

FIG. 4 is a diagram illustrating the detection of anomalous lateral movement in a network using an embodiment of a sub-model. In the illustrated example, an attacker uses a computer (e.g., a laptop) to log into the network using the compromised credentials of User A. Initially, the attacker moves laterally to Host 1, and subsequently, to Host 2. At Host 2, the attacker establishes a new session using the compromised credentials of User B. Subsequently, the attacker, posing as User B, moves laterally to Host 3 and then Host 4. The new session, established at Host 2, may trigger an alert for an unusual point of entry using the sub-model for credential compromise detection. The unusual point of entry may be detected, e.g., using the ranking mechanism as discussed herein. The point of entry relative to the session for User B at Host 4 is thus Host 2.

The modeling approach, in various embodiments, includes the generation of user graphs and population graphs. FIG. 5A illustrates one embodiment of an example user graph 500, which illustrates a path taken through a network by a user designated as User 1. Accordingly, a "user graph" is information indicative of a path through the network for a particular user, starting from a point-of-entry host to a current host; the path may also contain one or more intermediate hosts. As shown in FIG. 5A, User 1 moves laterally through a network from Host B, to Host C, and then Host D. The point of entry (or origin) for the session established using the credentials of User 1 in this example is Host B. This host may be evaluated to determine whether or not it is an unusual point of entry. For example, assuming the network also includes a Host A (not shown), an attacker using a different user's credentials could gain initial access to the network through Host A, and subsequent access to Host B. At Host B, the attacker could switch to the credentials of User 1.

In various embodiments, the model may use authentication logs (e.g., SSH authentication logs) to determine a user's point of entry and any intermediate hosts in order to determine the user's path. An unusual first point of entry, e.g., a server which does not accept connections from outside of the network, can indicate the compromise of the credentials of the user associated with the session. Thus, detecting credential compromise involves detecting the point of entry of a given user.

For a current session, a user graph that covers some given time period is generated. An example of such a graph is shown in FIG. 5A. A number of user graphs, such as for those users active during a given time period, may be used to generate a population graph 550, which aggregates user activity. An example is shown in FIG. 5B. In this particular example, two different user graphs (for User 1 and User 2) are assembled to form a population graph. Then, each of the hosts in the population graph may be assigned a ranking or a score. As shown, the ranking for Host B is R1, R2 for Host C, R3 for Host D, R5 for Host X, and R4 for Host Y. The respective values of these ranks may vary, although they are not necessarily all different from one another.

The ranking algorithm, in one embodiment, may be used to determine the "importance" of hosts within the network by counting the number and "quality" of links to a particular host by other hosts. One such methodology might be similar to the GOOGLE PAGERANK algorithm as applied to various hosts in a network. Accordingly, hosts that have more links from other hosts are ranked higher. Additionally, links from host that are in turn highly linked-to will also increase a host's rank (these are considered to be higher "quality" links). The ranking can be based on quantity and quality of links can be considered to be a "prevalence" ranking. One example of a host that is linked to from a large number of hosts is a server which is arranged to accept VPN connections from outside the network and provides a conduit for remote users to a large number of other servers within the network. A host that is linked to this VPN server, even if it has an otherwise low number of connections, would be an example of a host that is linked to a highly-linked host. Either type of host may be assigned a relatively high prevalence ranking.

Figure 5C:
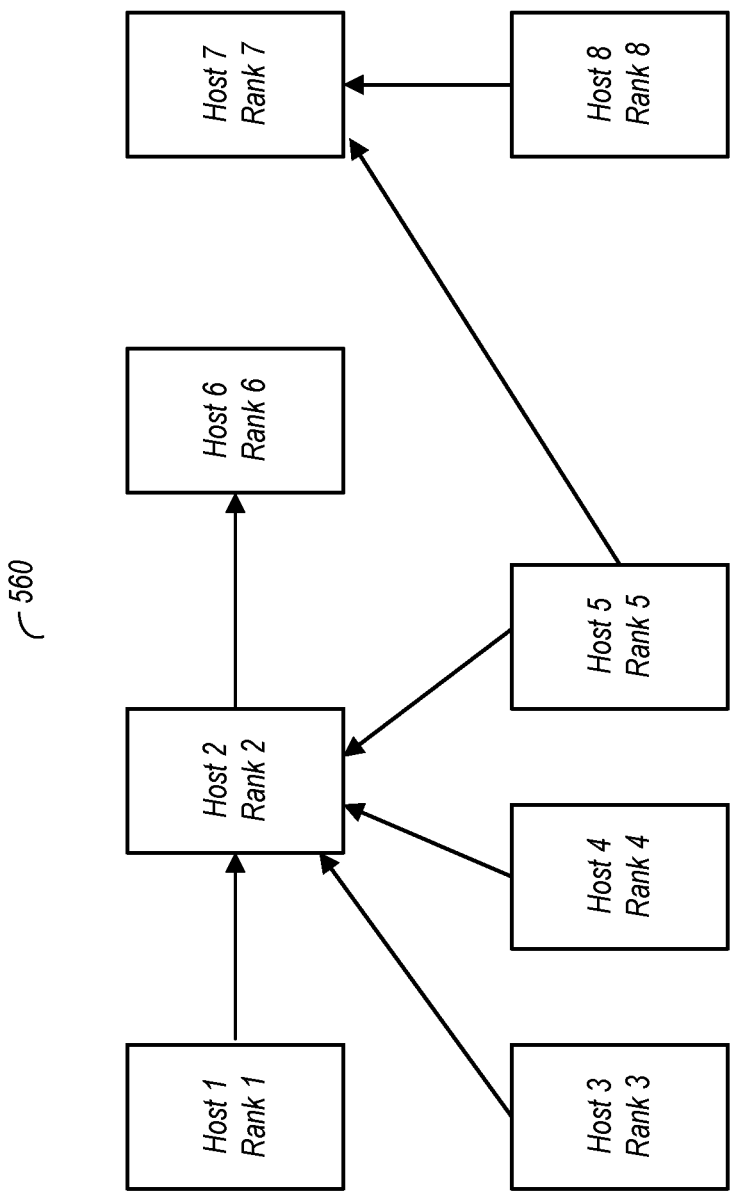
FIG. 5C is a block diagram illustrating a host ranking in a computer network as performed by one embodiment of a sub-model used for credential compromise detection.

FIG. 5C is a block diagram illustrating a ranking of hosts in a computer network as performed by one embodiment of a sub-module used for credential compromise detection. In the embodiment shown, network 560 includes a number of hosts, Hosts 1-8, each with a rank. As used herein, a "rank" or "ranking" can either connote a relatively ordering of hosts according to some score, or the score value itself. Thus, a rank value could indicate merely that Host 2 is the highest ranked host, or a rank value could indicate a numerical value for Host 2, which can then be used in turn to either assess Host 2 relative to some other host or to a threshold value. This ranking information may be stored in the form of a population graph as shown in FIG. 5B. The values of these ranks may vary from one host to another, although the respective ranks are not necessarily all different. But the ranking of a particular host may be higher if it has a larger number of hosts connecting thereto, or if it is connected to another high-ranking host.

In the example of FIG. 5C, Host 2 is the highest-ranking host, as it has the largest number of other hosts connecting thereto (Hosts 1, 3, 4, and 5). Host 6 in the illustrated example outranks Hosts 1, 3, 4, 5, and 8, as the former is connected to a high-ranking host (Host 2). Host 7 also outranks Hosts 1, 3, 4, and 8, as it is connected to two hosts.

Under this methodology, hosts having a large number of connections thereto, internal or external, will have a high ranking. Hosts with a lower number of connections will be lower ranking. This insight may be used by the first sub-model to make a determination of regarding the "importance" or commonality of the point of entry for a particular session. In some instances, a malicious user may access the network using a first set of user credentials at a low-ranking host, and subsequently access other hosts, possibly switching to other users' credentials along the way. By identifying the point of entry, and then determining its rank, this sub-model can thus assess whether the point of entry is indicative of anomalous movement within the network.

Using the user graph discussed in reference to FIG. 5A, all connections for the given session are determined (e.g., the host where the session originated and hosts subsequently accessed during the session). A population graph can be assembled from a number of user graphs. The hosts of population graph discussed in reference to FIG. 5B are then ranked. In one embodiment, let the score of the host B, which is the point of entry for the user corresponding to the user graph of FIG. 5A, be the minimum i.e. R_minimum. Let the same host B have a score R_population as determined by the population graph. If R_minimum<R_population, the point-of-entry analysis performed by the first sub-model may determine that the credentials of the user associated with the session have been compromised, and may thus indicate that the lateral movement associated with the session is anomalous. More generally, the score of a point-of-entry host for a given user session is compared with the score from the population graph, to provide an indication whether anomalous lateral movement is occurring in a particular session.

Figure 6:
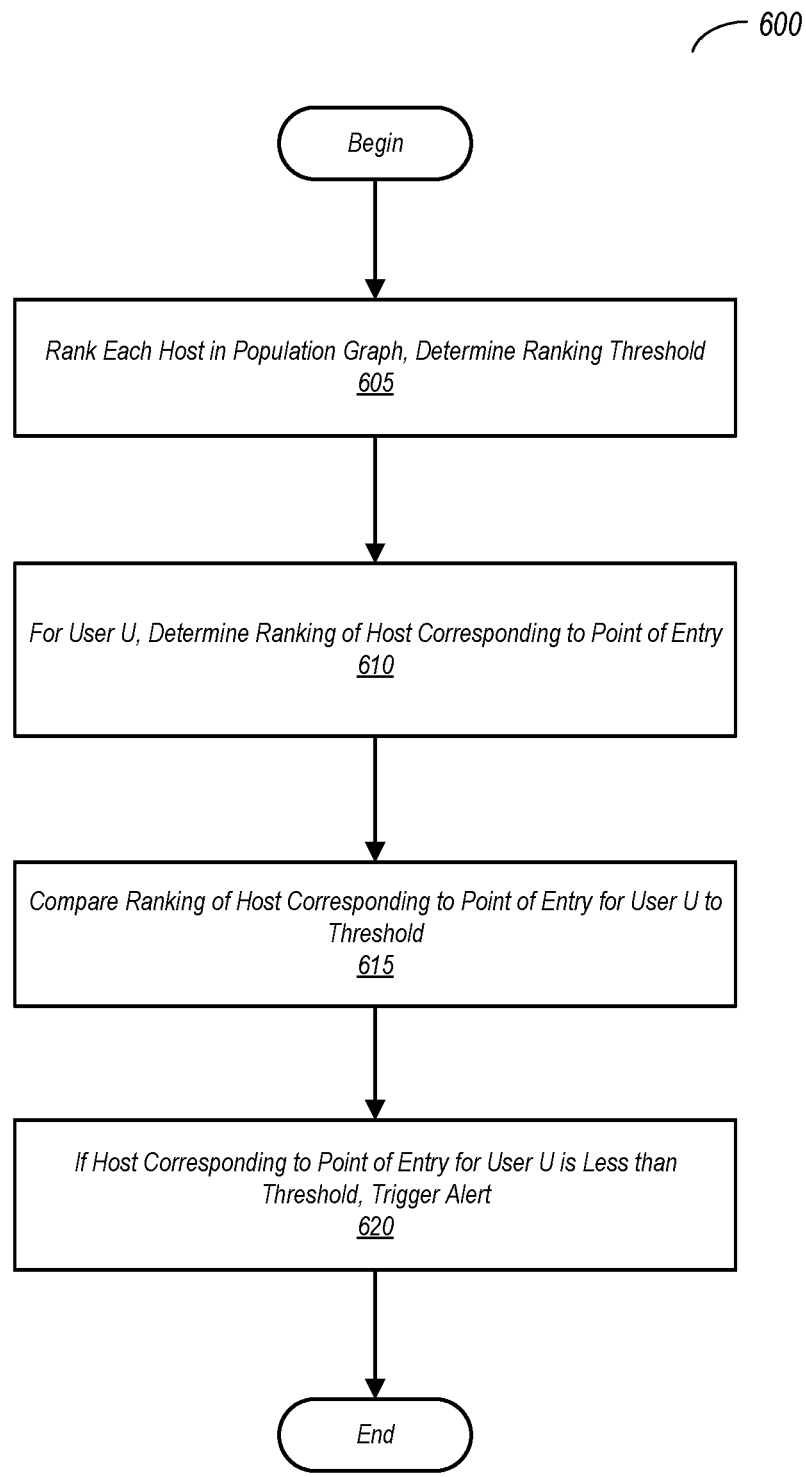
FIG. 6 is a flow diagram of one embodiment of a method for detecting anomalous lateral movement using a sub-model for credential compromise detection.

FIG. 6 is a flow diagram of one embodiment of a method for detecting anomalous lateral movement using a model for credential compromise detection. Method 600 may, in one embodiment, by executed on a computer system using (or as part of) a machine learning model. In embodiments in which Method 600 is carried out as a sub-model of a larger machine learning model, in conjunction with other sub-models, and may contribute to an overall score.

Method 600 includes ranking each host in a population graph and determining a ranking threshold (block 605). As described above, each host in a population graph (assembled from a number of user graphs) may be assigned a ranking value based on various factors. These factors can include, for a given host, a number of other hosts that access the given host, and the respective rankings of hosts accessing the given host.

For a User U (whose user graph makes up part of the population graph), the method further include determining the ranking of a host corresponding to that user's point of entry (block 610). As previously explained, the point of entry is the host within the network from which the user first established communication within the network, beginning a path that leads to a current session on some (potentially different) host. Some hosts within a network may, for example, be equipped to accept VPN connections from outside the network, and may accordingly have a high ranking. Other hosts may, for example, be servers internal to the network that are infrequently accessed by other hosts and do not accept connections from outside the network, and thus have a lower ranking.

Method 600 further includes comparing the score of the host corresponding to the first point of entry for User U to the threshold (i.e. score of the same host in the population graph) (block 615). If the host score is less than a threshold, the method may trigger an alert (block 620). Otherwise, when the ranking of the host of User U's point of entry is equal to the threshold, no alert is triggered. The alert may be a binary value, or may be a score value.

Second Sub-Model—Timing Analysis:

As discussed above in reference to FIG. 2, a second sub-model (sub-model 210B) may be utilized for anomalous timing detection. In detecting anomalous timing, the login and session timing for a current session may be evaluated against a history of logins by the user associated with that session. For example, a history of three months of login/session behavior may be used to evaluate a current login for a particular user in some embodiments. Current (active) session information, may be evaluated against the history. If the current session deviates from the history of login behavior, it may indicate anomalous lateral activity, particularly if the deviation is by a significant amount.

Figure 7A:
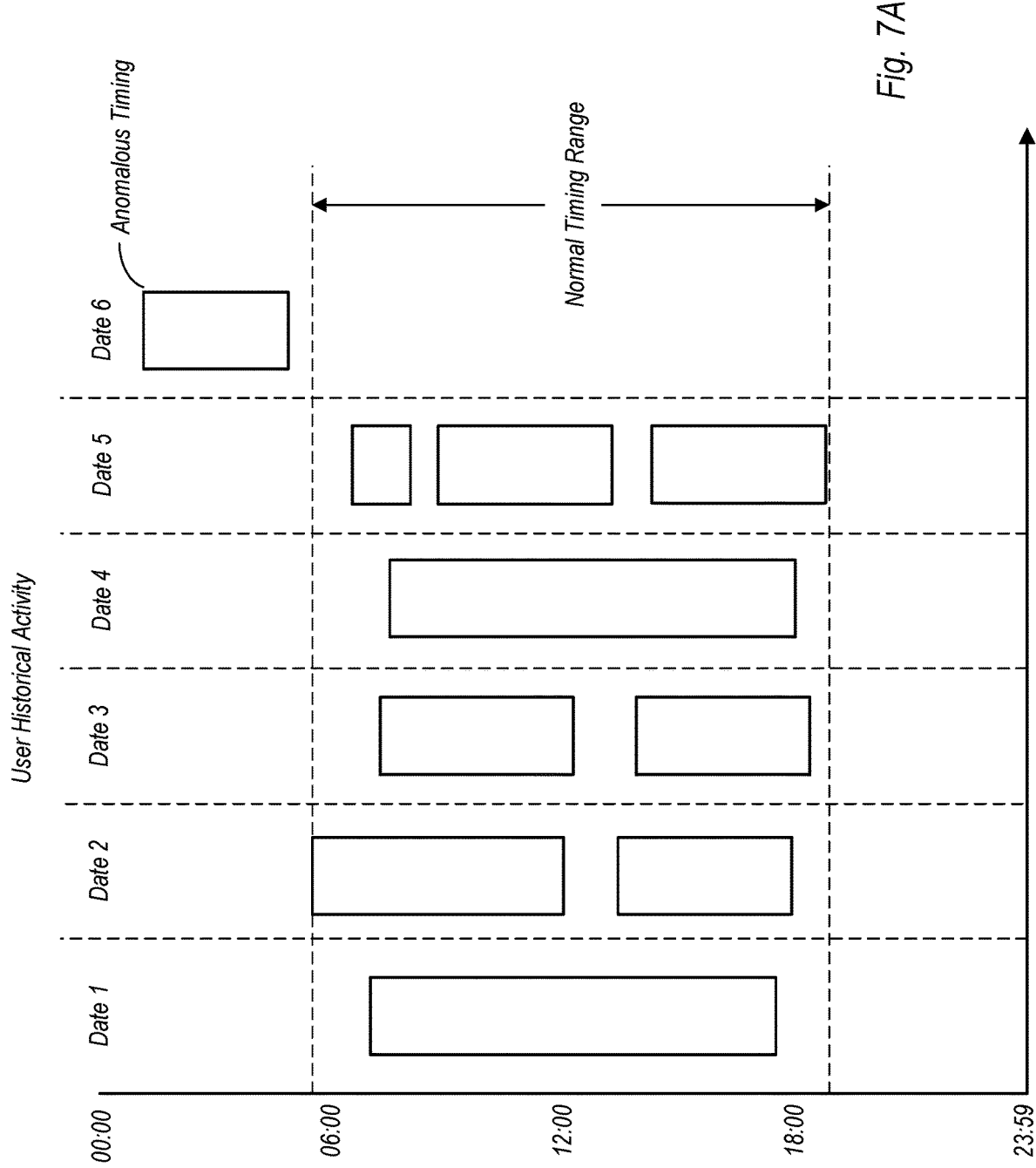
FIG. 7A is a diagram illustrating operation of one embodiment of a sub-model for detecting anomalous lateral movement based on anomalous timing of a session for a particular user.

FIG. 7A is a diagram illustrating operation of one embodiment of a sub-model for detecting anomalous lateral movement based on anomalous timing of a session for a particular user. In the example shown, the timing of sessions for a particular user over a number of dates is shown. This historical data in this example is used to determine a normal range of session times. However, on Day 6 in the illustrated example, a session is established that is outside of the user's normal timing range. Accordingly, the timing of the session on Date 6 of the diagram are anomalous relative to the normal session times the particular user. In this situation, the score generated by the timing analysis sub-model would indicate a high likelihood that the session on Date 6 is associated with anomalous lateral movement.

Generally speaking, the timing analysis sub-model may observe the timing of a current session, generate a score based on the timing. Sessions that exhibit both anomalous timing based on a user's previous history may generate scores that indicate a high likelihood of anomalous lateral movement in the network.

In some embodiments, a user's activity during the session may also be considered (e.g., as a weighting factor) in generating the score from the timing analysis sub-model, either within the sub-model itself or in conjunction with other sub-models (such as the peer analysis sub-model discussed below). This may be used, for example, to account for an authorized user logging in from a different time zone when travelling for business or some other similar situation.

Figure 7B:
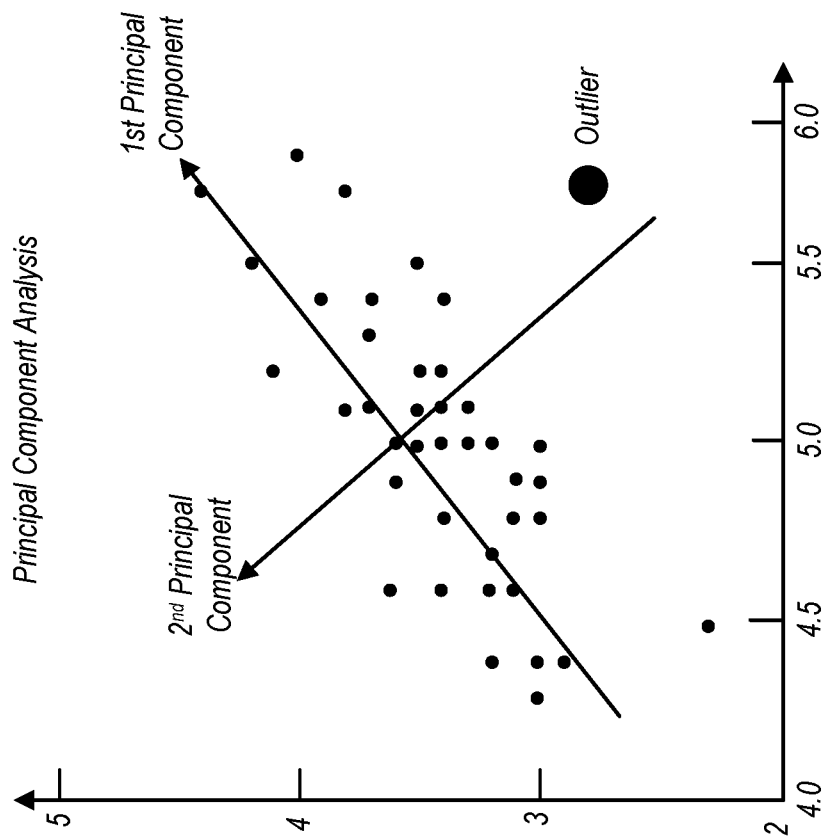
FIG. 7B is a diagram illustrating principal component analysis used by one embodiment of a sub-model for detecting anomalous lateral movement based on anomalous timing of a session for a particular user.

In various embodiments, the timing analysis machine learning sub-model discussed herein utilizes principal component analysis. In principal component analysis, given a collection of points in multi-dimensional space, a best fitting line may be determined. The best fitting line may be defined as one that minimizes the average squared distance of the various points to the line. The process may be repeated to determine a second line that is perpendicular to the first. An example of principal component analysis is shown in FIG. 7B. In the illustrated example, a number of data points are scattered in two-dimensional space. From these scattered points, two different principal component lines can be drawn—a first principal component (the first line to be determined) and the second principal component (determined during a repeat of the process). The graphic example also illustrates one point that is an outlier with respect to the remaining point, and in particular, with respect to the first principal component line.

Using principal component analysis, the timing analysis sub-model may use session history for a user (e.g., obtained from SSH session logs) to create a user profile based on the user's historical SSH login activity. Principal component analysis is performed on this user login activity data, to capture the patterns in the user's login behavior. Given a new login activity for the user, it can be determined if this point is an outlier with respect to the principal component axes determined based on the history of the user's previous sessions. If the point corresponding to the current session is determined to be an outlier, the timing analysis sub-model may generate an alert or a score indicative that the timing for the current session is anomalous, and could be associated with anomalous lateral movement.

Generally speaking, principal component analysis is a dimensionality reduction technique that projects multi-dimensional points from a high dimensional space to a lower dimensional subspace using the first few principal components. The following steps are involved in detecting outliers using principal component analysis:
  a. The principal component analysis algorithm is applied to the matrix consisting of high dimensional data points to identify the first few principal components (capturing 99.99% of variance in the data).
  b. Given a new multi-dimensional data point P, it is projected onto the principal components and reconstructed back to its original dimensionality P_reconstructed.
  c. The absolute value of difference between the two vectors i.e |P−P_reconstructed| is used as a measure to determine if the new point P is an outlier. Outliers are the ones where the difference is greater than a threshold.

Thus, using this method, sessions that are outliers may be detected and flagged for further analysis and/or termination.

Third Sub-Model—Mode of Access Analysis:

A third sub-model used in the detection of anomalous lateral movement is directed to detecting the mode of access to the network used during the current session. In general, a truly authorized access to a network may have a limited number of modes by which such access can be obtained. These types of access may be referred to as "permitted" modes of access, or permitted connection types. For example, a user may connect to the network using a WiFi connection and/or using a virtual private network (VPN). Access from a computer of the user that is directly connected to the network (e.g., a wired connection via an Ethernet cable) may be another mode by which access to the network can be obtained.

Figure 8A:
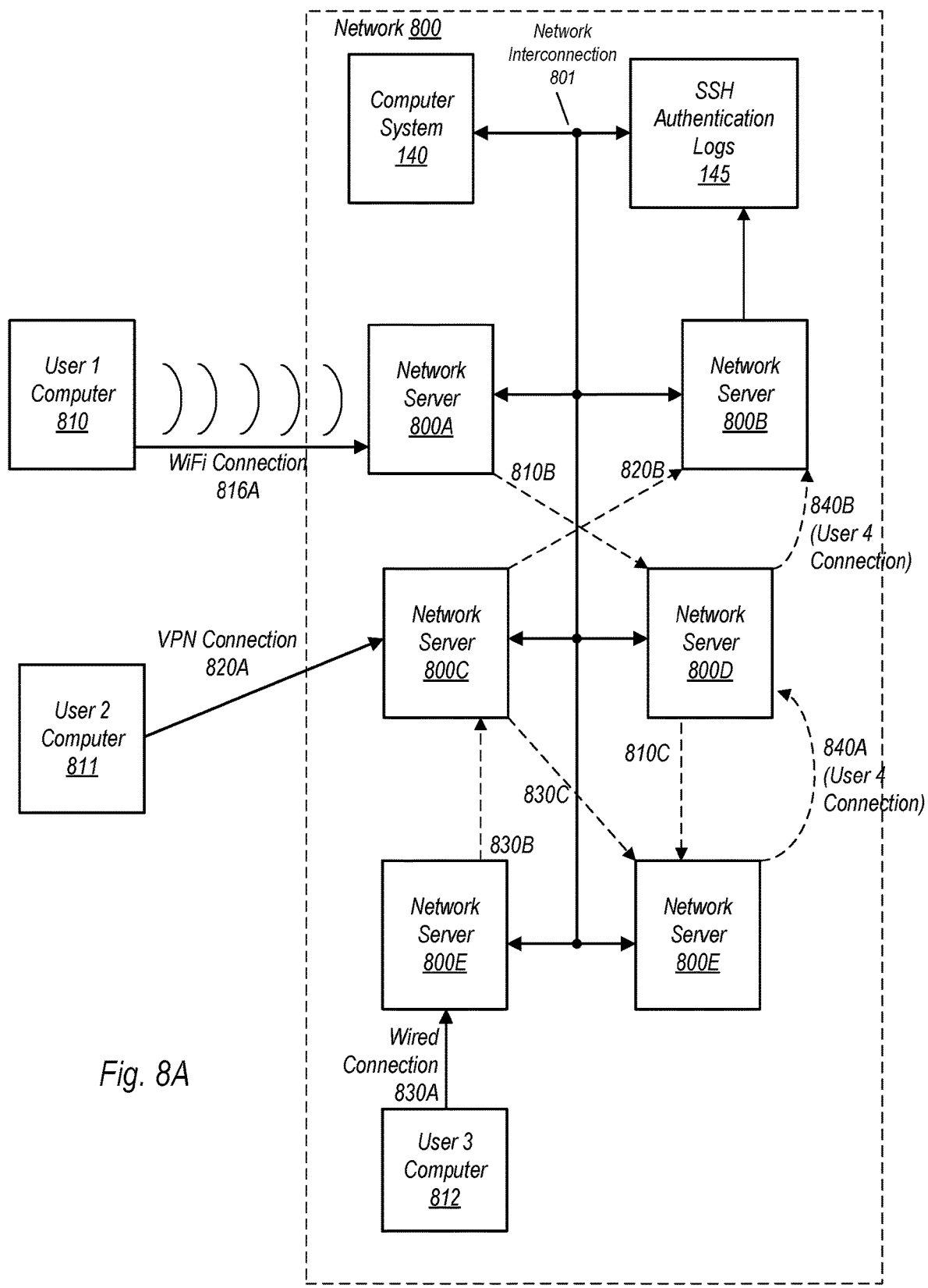
FIG. 8A is a block diagram of a network illustrating operation of one embodiment a sub-model for detecting a mechanism through which a user establishes a session with the network.

FIG. 8A is a block diagram of a network illustrating operation of one embodiment a sub-model for detecting a mechanism through which a user establishes a session with the network. In the embodiment shown, network 800 includes network servers 800A through 800E coupled to one another by a network interconnection 801. Additionally, a computer system 140 (similar to that shown in FIG. 1), is coupled to the network via interconnection 801 to perform monitoring and evaluation functions to, among other things, detect anomalous lateral movement within network 800. SSH authentication logs 145, which store information regarding current and previous SSH sessions, may also be available for access by computer system 140, and may be implemented on a server within network 800.

In this example, three different computers, User 1 computer 810, User computer 811, and user computer 3 computer 812 are coupled to servers in network 800. User 1 computer 810 is coupled to network server 800A via a WiFi connection 816A, with subsequent lateral movement to network server 800D (via path 810B) and network server 800E (via path 810C). User 2 computer 811 is coupled to network server 800C via a VPN connection 820A, with subsequent lateral movement to network server 800B via path 820B. User 3 computer 812 is connected to network server 800E via a wired connection 830A, with subsequent lateral movement to network server 800C (via path 830B and network server 800E (via path 830C). Information regarding these connections (e.g., whether connected by WiFi, VPN, or wired connection) and movement within the network during these sessions is provided to computer system 140 and SSH authentication logs 145 via network interconnection 801.

Within a given network, certain modes of access thereto, such as those discussed above, may be considered as "permissible," "expected," or "authorized" modes of access. For the example of network 800 as shown here, a mode of access by WiFi, VPN, or wired connection are defined as the expected modes of access. A session for which there are no active expected modes of access may be indicative of anomalous lateral movement. In the example illustrated in FIG. 8A, a connection by User 4 is shown as originating at network server 800E, with lateral movement to network server 800D via path 840A and subsequently to network server 800B via path 840B. Since the connection of User 4 does not include any of the expected modes of access as defined for network 800, this session may trigger an alert by a sub-model used to perform mode of access analysis. Furthermore, the lateral movement by User 4 may be consider anomalous due to the fact that no expected mode of access is detected for the corresponding session.

Figure 8B:
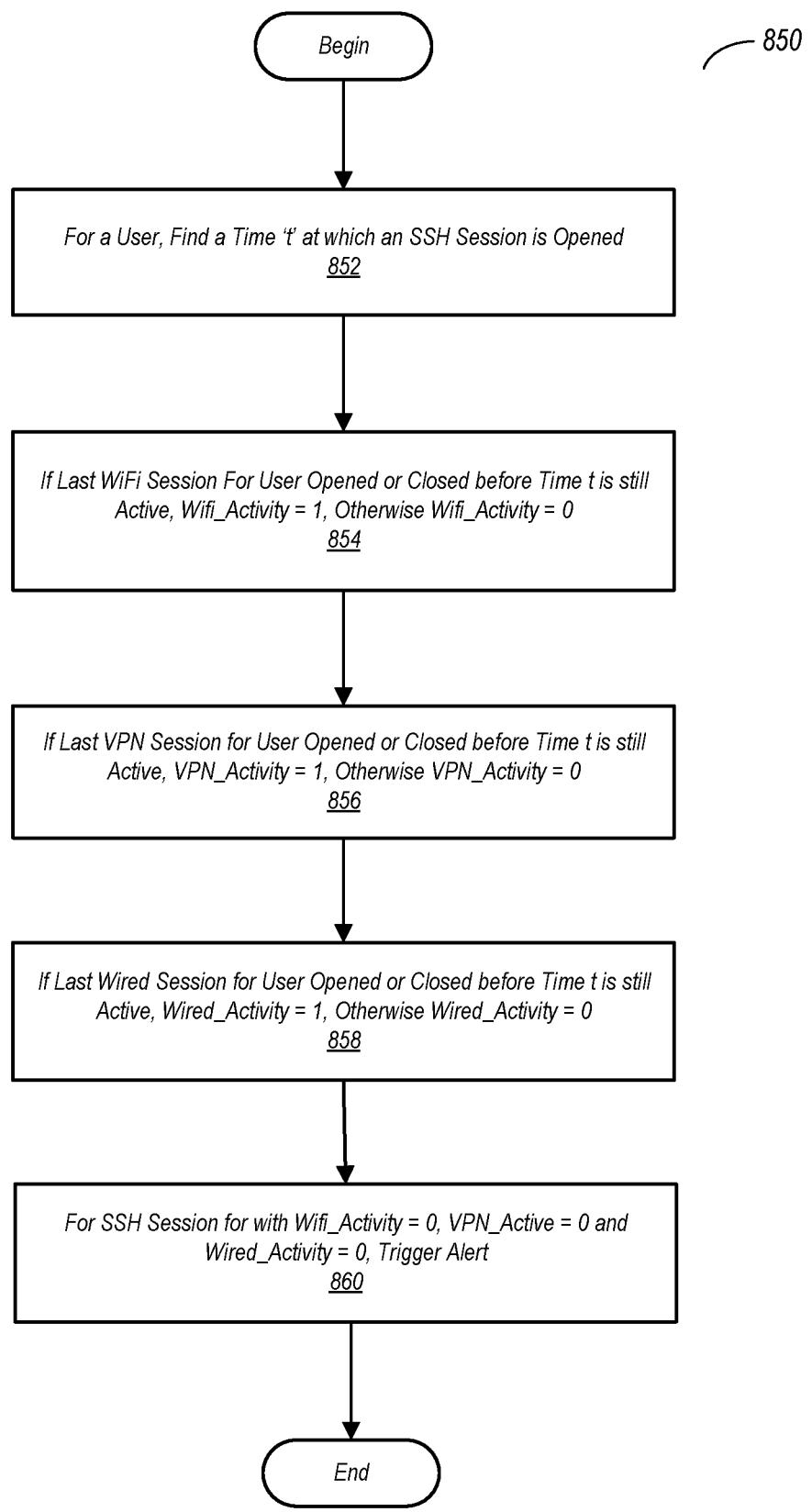
FIG. 8B is a flow diagram illustrating one embodiment of a method for detecting a mechanism through which a user establishes a session with the network.

FIG. 8B is a flow diagram illustrating one embodiment of a method for mode of access analysis which may be carried out by a corresponding sub-model. Method 850 may be executed on a computer system, such as computer system 140, using session information obtained from, e.g., session logs 145, as shown in FIG. 8A.

Method 850 include determining, for a user, a time 't' at which an SSH session was opened (block 852). The user here refers to a user whose credentials were used to establish the SSH session, whether by the actual user or an attacker who has obtained those credentials. The method further includes determining, if the last WiFi session for the user was opened or close before time 't' is still active (block 854), and setting a variable WiFi Activity=1 if so, otherwise WiFi Activity=0. Similarly, the method includes determining, if the last VPN session for the user was opened or closed before time T is still activite (block 856), and setting a variable VPN_Activity=1 if so, or otherwise setting VPN_Activity=0. The method also includes determining, if the last wired session for the user was opened or closed before time T is still active (block 858), and setting a variable Wired_Activity=1 if so, or otherwise setting Wired_Activity=0. These checks may determine whether or not the mode of access for the particular session is one that is defined as a permitted connection for that particular network. For sessions in which Wifi_Activity=0, VPN_Activity=0, and Wired_Activity=0, an alert is triggered (block 860). The alert indicates that mode of access for the session being analyzed is not one of the modes defined as not falling within a group of connections that define the permitted connection types for that particular network, and thus the session may be associated with anomalous lateral movement.

Fourth Sub-Model—Peer Analysis:

A fourth sub-model for detecting the presence of anomalous lateral movement in a network utilizes peer analysis. In this type of lateral movement detection, peers, or cohorts, of a particular user are identified. Peers may be assigned based on, e.g., job function within the organization. Alternately, peers may be dynamically determined based on historical data. Once peer groups are established, the activity of an SSH session that is attributed to a particular user may be compared to activities of the particular user's peers. For example, if User A is identified as a software engineer that works on certain projects within the organization, that user may be grouped with other software engineers that work on the same projects. When User A subsequently establishes an SSH session, the activity performed during that session may be compared to activities of those identified as peers. If the activity differs, it may trigger an alert that lateral movement is occurring within the network. Thus, if an attacker gains access to the network using the credentials associated with User A but performs activities that do not correspond to User A's past activity or User A's peers past activity, Sub-model 4 may flag the activity and trigger an alert.

FIG. 9A is a chart 900 illustrating the grouping of users in one embodiment of a sub-model that detects anomalous lateral movement in a network based on peers of a particular user. The peer analysis sub-model as discussed herein may group users into clusters, as shown in the chart. In this example, User Cluster #1 includes users U1 and U2, and lists the number of days (in the past 30 days) that each user is active on host H1 in Time Range 1 and Time Range 2. Neither of the two users (U1, U2) from User Cluster #1 are shown active during Time Range 3 and Time Range 4 in the past 30 days. Users from User Cluster #2, U3 and U4, are active on Host 1 in Time Ranges 3 and 4 but are inactive in Time Ranges 1 and 2.

In addition to looking at time ranges and hosts, the fourth sub-model may also look at activities performed on a particular host, e.g., directories accessed on a given host, software programs used, data uploaded and/or downloaded, and so on. Generally speaking, the sub-model directed to peer analysis may determine which activities performed by a group of users identified as peers of one another, including a user associated with the current session. Additionally, network administrators or other personnel responsible for maintaining the various sub-models may manually input information regarding users, peers of those users, job functions/titles of members of peer groups, and so on.

Figure 9B:
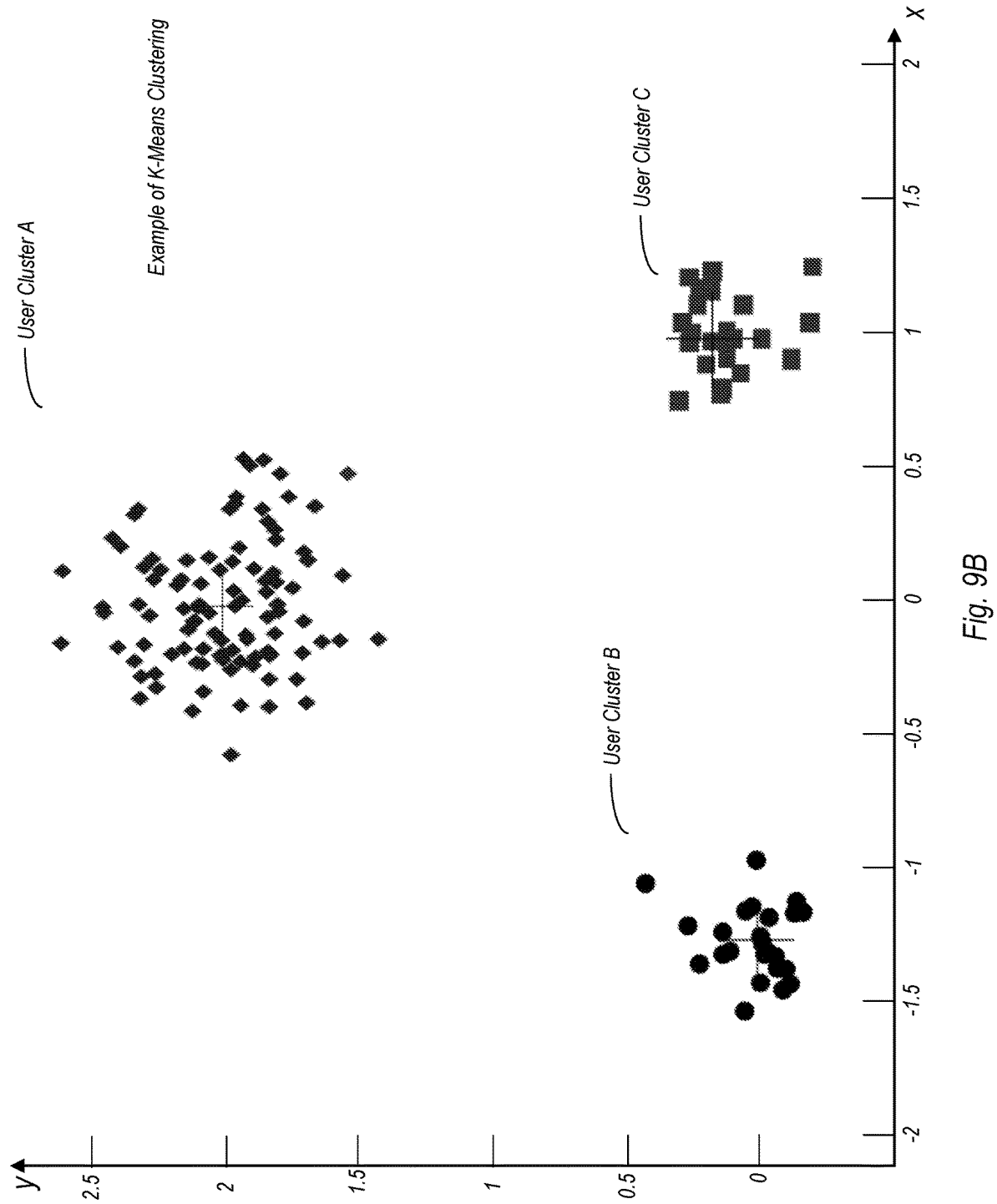
FIG. 9B is a graph illustrating k-means clustering used by one embodiment of a sub-model that detects anomalous lateral movement in a network based on peers of a particular user.

In various embodiments, the peer analysis sub-model utilizes k-means clustering to cluster user for identifying peers, an example of which is illustrated in FIG. 9B. K-means clustering is a method of vector quantization in which a number of observations may be partitioned into a number of clusters k. In the illustrated example, three different user clusters (User Clusters A, B, and C) are shown. These clusters may correspond to groups of peers. Each of the observations may belong to the cluster with the nearest mean (e.g., a cluster center or centroid). The observations can be, for example, the distribution of time spent by a user in a 24-hour time window on a particular host in the past X days as described in chart 900 (FIG. 9A), among other things. Typically, peers of a given user will fall within the same cluster as the user themselves.

FIG. 9C is a diagram illustrating operation of one a sub-model that detects anomalous lateral movement in a network based on comparing session activity with those of peers of a particular user. In the illustrated example, session times and activities for two different users identified as peers of one another are tracked on a particular host (identified here as Host 1). On Date 1 through Date 5, the activities and session times performed by these peers are relatively consistent. The activities performed may be utilizing a certain software program on Host 1, writing programming code for a program residing on Host 1, or any other activities that would be performed on the same host by two different users identified as peers of one another.

On Date 6, a session identified as performed by User 2 (actually performed by an attacker using credentials of the former) is detected that deviates from the history of the user and his peer group in both time, activity, and host accessed (Host 2 in this case). The peer analysis sub-model may detect this deviation and, accordingly, generate a score indicating the possibility of anomalous lateral movement.

Figure 10:
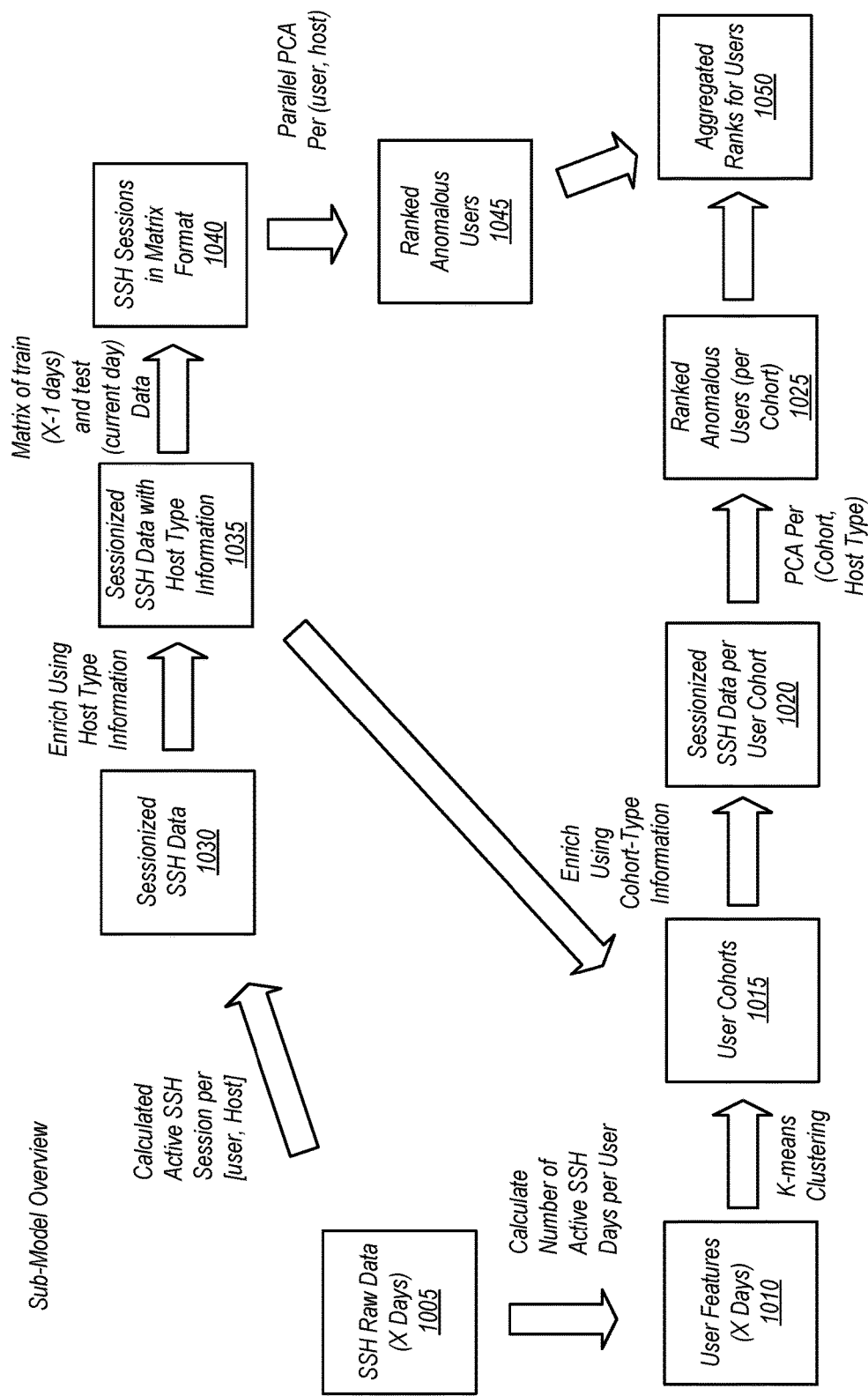
FIG. 10 is a diagram providing an overview of one embodiment of a sub-model that detects anomalous lateral movement in a network based on comparing session activity with those of peers of a particular user.

FIG. 10 is a block diagram illustrating an overview of one embodiment of a machine learning sub-model that performed peer analysis to detect anomalous lateral movement within a network. Note that in various models, any combination of one or more of the following techniques may be used together. The analysis begins with the collection of SSH raw data (e.g., from SSH session logs) for X number of days (block 1005).

The SSH raw data is used to calculate active SSH sessions per user and per host, thereby producing sessionized SSH data (block 1030). This data may be enriched to produce SSH data with host type information (block 1035). The SSH data may then be divided into the current day and X−1 preceding days and the current date and assembled into a matrix format (block 1040). Using this matrix, a ranking of anomalous users is generated (block 1045) using Principal Component Analysis (PCA) technique.

In order to identify user cohorts, features are extracted (block 1010) for the users for the same X number of days (block 1005). One example of a feature is the number of times in the past X days, a user connected to a host during a time window T1. K-means clustering may then be performed on the features extracted and cohorts (peers) of various users may be identified (block 1015). The sessionized SSH data with host type information (block 1035) is than aggregated using the cohort information (block 1015). This gives us sessionized SSH data per user cohort (block 1020), which is then converted to a matrix format as before and PCA is used to detect and rank anomalous cohorts (block 1025).

The user ranks (block 1045) are combined with cohort ranks (block 1025) to produce aggregated ranks. This aggregated ranking can then be used to determine which sessions, if any, are associated with activities that deviate from both user's past behavior as well as the behavior of peers of the user. Those sessions that are shown to be anomalous, relative to the user associated with the session, may then be flagged as potentially being associated with anomalous lateral movement in the network.

Generally speaking, the peer analysis sub-model may use any information or parameter that is common among a group of peers. This information may then be used by the sub-model to evaluate the activity of a particular user with respect to other users identified as peers. Techniques such as k-means clustering and principal component analysis may be used to determine which users are peers of one another, as well as to identify sessions established with the credentials of a particular user that are outliers with respect to their peers. Based on this evaluation, a score may be generated indicating the likelihood that a current session is associated with anomalous lateral activity.

Figure 11:
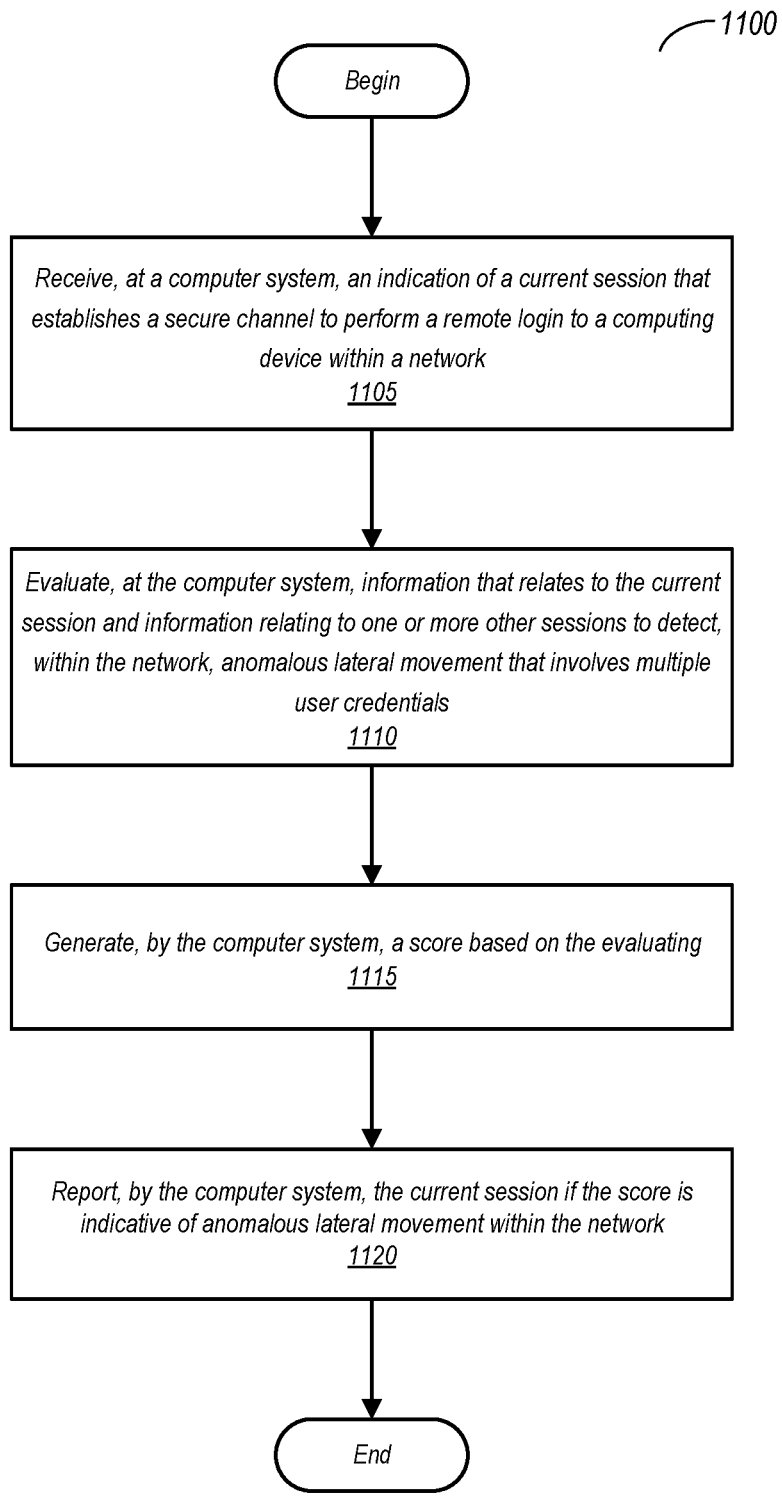
FIG. 11 is a flow diagram illustrating one embodiment of a method for detecting anomalous lateral movement in a network.

Method Flow Diagrams:

FIG. 11 is a flow diagram illustrating one embodiment of a method for detecting anomalous lateral movement in a network. Method 1100 may be performed on a computer system in a network such as computer system 140 shown in FIG. 1. The method may, in one embodiment, be carried out by a machine learning model executed on such a computer system.

Method 1100 includes receiving, at a computer system, an indication of a current session that establishes a secure channel to perform a remote login to a computing device within a network (block 1105). The method further includes evaluating, at the computer system, information that relates to the current session and information relating to one or more other sessions to detect, within the network, anomalous lateral movement (e.g., by detecting multiple user credentials) (block 1110). Thereafter, the method continues by generating, by the computer system, a score based on the evaluating (block 1115) and reporting, by the computer system, the current session if the score is indicative of anomalous lateral movement within the network (block 1120).

The method may be carried out utilizing a machine learning model having a number of sub-models. The evaluating performed by a first sub-model may include determining if credentials of a user associated with the current session have been compromised based on a point of entry into the network for the current session. The evaluating further includes determining a ranking of a computing device within the network, relative to other computing devices within the network, in which a user associated with the current session first accessed the network.

Utilizing a second sub-model, the evaluating comprises a determining whether timing of the current session is anomalous based on a history of previous sessions associated with a particular user. This evaluation may further include tracking activity associated with the current session based on determining that activity performed during the current session is anomalous relative to activity performed during previous sessions established by a particular user associated with the current session.

Another sub-model used in carrying out the method may include determining whether the user associated with the current session has an active permissible connection to the network (e.g., VPN, WiFi, wired connection). More generally, the evaluating for this sub-model comprises determining if a user associated with the current session has an active one of a plurality of permitted connection types to the network.

A fourth sub-model may be based on comparisons of various aspects of a session associated with a particular user to those of users identified as peers of the particular user. Accordingly, using the fourth sub-model, the evaluating includes detecting anomalous activity associated with a particular user during the current session relative to other users of the network identified as peers of the particular user. This may in turn include comparing or more hosts accessed during the current session relative to one or more hosts accessed by other users identified as peers of the particular user. The peer-based analysis may also include comparing a time at which the current session is active relative to times at the peers of the particular user have historically established sessions with the network. The evaluating performed using peer-based analysis may also include detecting anomalous activity associated with a particular user during the current session relative to other users of the network that have been clustered as having historical activity similar to the particular user.

To summarize the above, in some embodiments, the evaluating includes utilizing two or more of the following sub-models of an anomalous lateral movement detection module in order to generate the score:

a first sub-model operable to if credentials of a particular user associated with the current session have been compromised;

a second sub-model operable to detect anomalous timing of activity relative to a history of sessions established by the particular user;

a third sub-model operable to determine whether a current session was established via one of a number of active permissible connection types associated with the particular user; and a fourth sub-model operable to detect anomalous activity during the current session relative to peers of the particular user.

Figure 12:
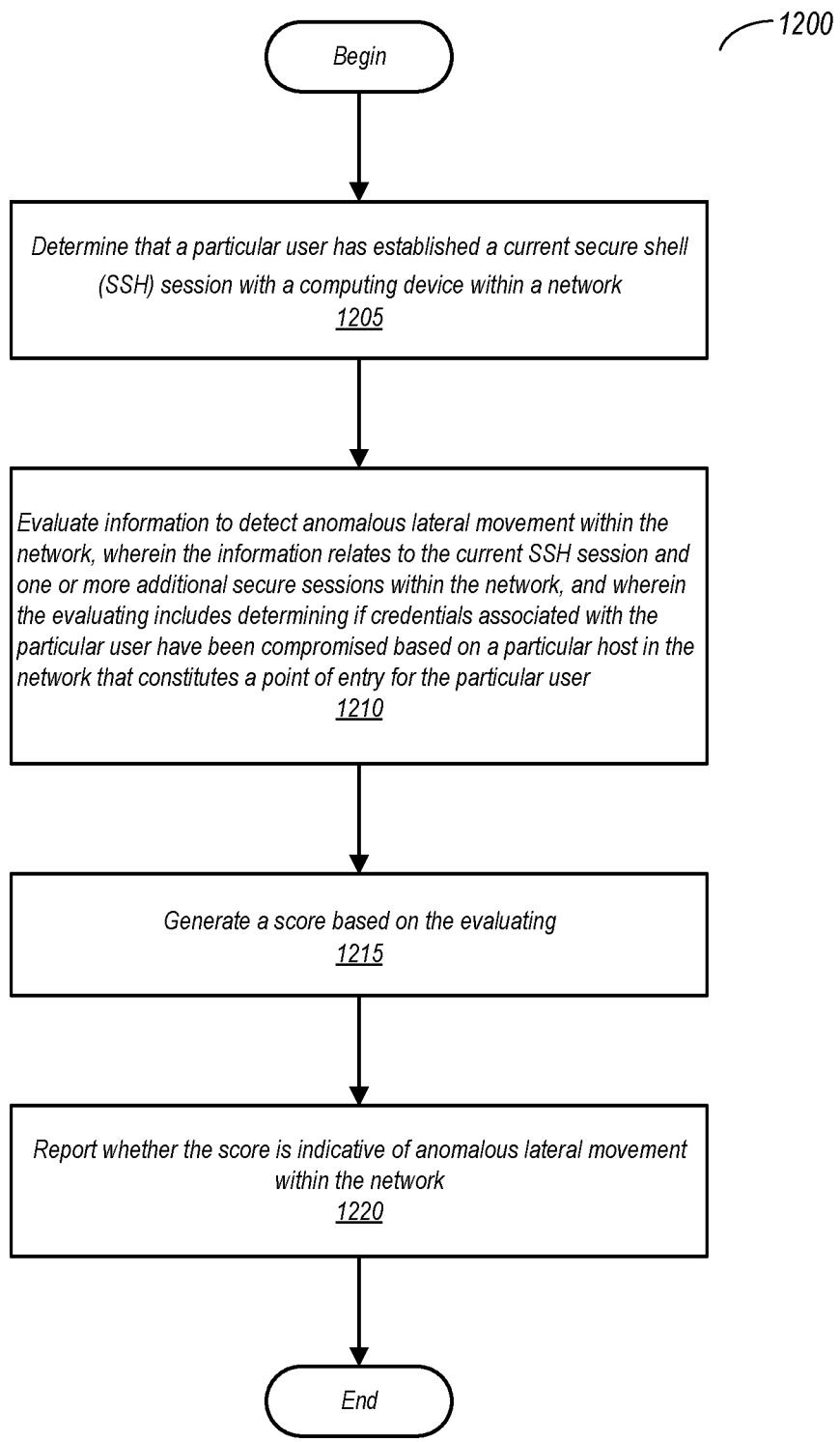
FIG. 12 is a flow diagram illustrating one embodiment of a method for detecting anomalous lateral movement in a network using credential compromise detection.

FIG. 12 is a flow diagram illustrating one embodiment of a method for detecting anomalous lateral movement in a network using credential compromise detection. Method 1200, in various embodiment, includes the utilization of a machine learning model that, among s things, may detect when a user's credentials have been compromised. The method may be carried out by a computer system in or coupled to a network, such as computer system 140 as shown in FIG. 1. Furthermore, the instructions used to carry out the method may be implemented on a non-transitory computer readable medium, such as disk storage, optical disk, or other suitable medium.

Method 1200 includes determining that a particular user has established a current secure shell (SSH) session with a computing device within a network (block 1205). The method further includes evaluating information to detect anomalous lateral movement within the network, wherein the information relates to the current SSH session and one or more additional secure sessions within the network, and wherein the evaluating includes determining if credentials associated with the particular user have been compromised based on a particular host in the network that constitutes a point of entry for the particular user (block 1210). Thereafter, the method includes generating a score based on the evaluating (block 1215) and reporting whether the score is indicative of anomalous lateral movement within the network (block 1220).

In various embodiments, the evaluating further includes determining a ranking of the host relative to other hosts in the network. Determining the ranking of the host relative to other hosts comprises first generating user graphs for users during a particular time period, wherein the user graph for a given user indicates host connections by the given user. Determining the ranking of the host relative to others further includes generating, from the user graphs, a population graph indicative of all hosts in the network accessed by the users of the network during the particular time period.

In various embodiments, determining if credentials associated with the particular user have been compromised is based on a host in the network at which the current SSH session originated. This in turn includes comparing a ranking of the host in the network to a threshold, and triggering an alert if the ranking of the host is less than a threshold value, wherein the threshold is based on a plurality of other hosts in the network. A ranking for a particular host in the network is assigned based on a number of users accessing the particular host and respective rankings of other hosts coupled to the particular host.

Figure 13:
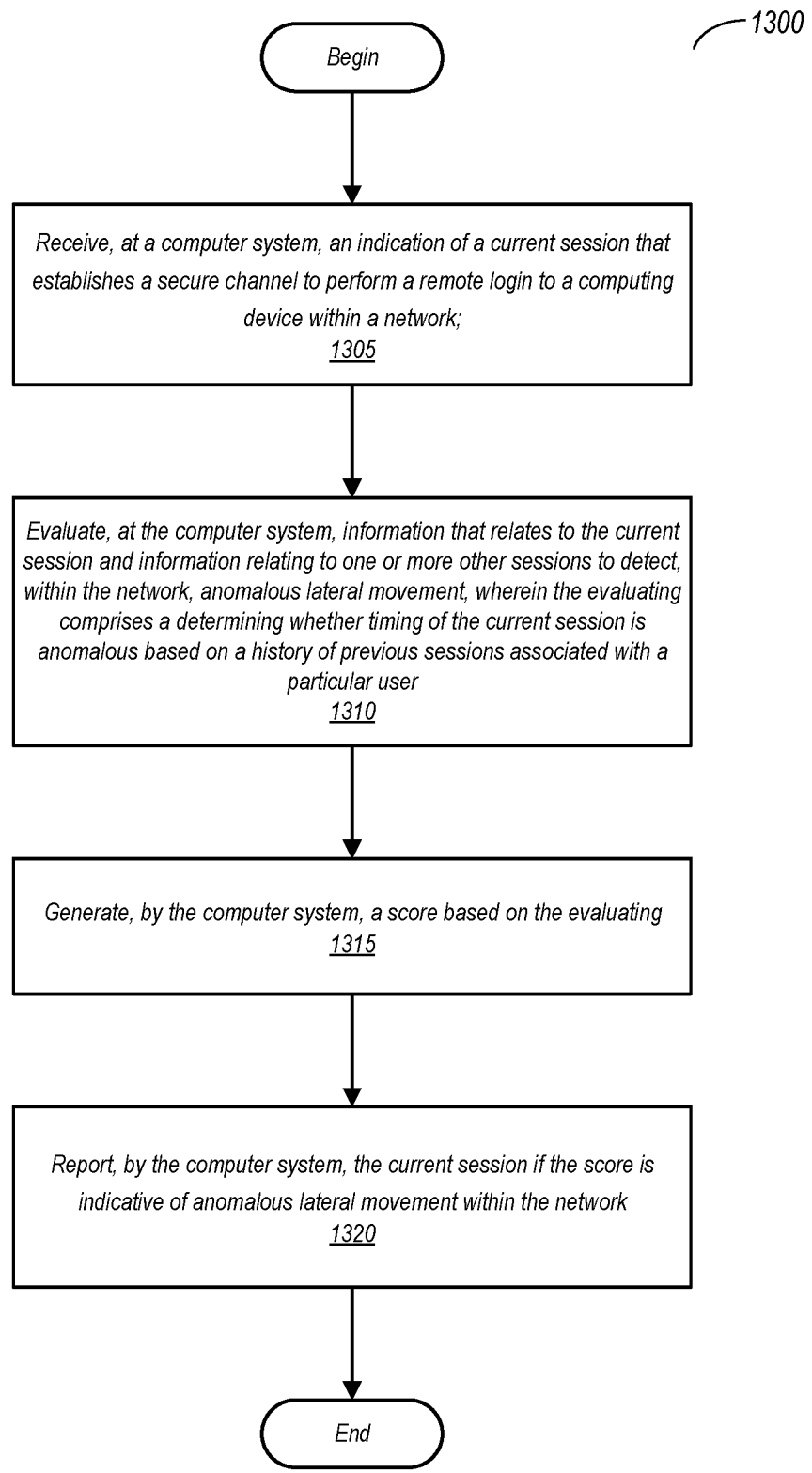
FIG. 13 is a flow diagram illustrating one embodiment of a method for detecting anomalous lateral movement based on detecting anomalous timing of a session for a particular user.

FIG. 13 is a flow diagram illustrating one embodiment of a method for detecting anomalous lateral movement based on detecting anomalous timing of a session for a particular user. Method 1300 may be performed on a computer system in a network such as computer system 140 shown in FIG. 1. The method may, in one embodiment, be carried out by a machine learning model (or sub-model) executed on such a computer system.

Method 1300 includes receiving, at a computer system, an indication of a current session that establishes a secure channel to perform a remote login to a computing device within a network (block 1305). The method further includes evaluating, at the computer system, information that relates to the current session and information relating to one or more other sessions to detect, within the network, anomalous lateral movement, wherein the evaluating comprises determining whether timing of the current session is anomalous based on a history of previous sessions associated with a particular user (block 1310). Thereafter, the method includes generating, by the computer system, a score based on the evaluating (block 1315) and reporting, by the computer system, the current session if the score is indicative of anomalous lateral movement within the network (block 1320).

Figure 14:
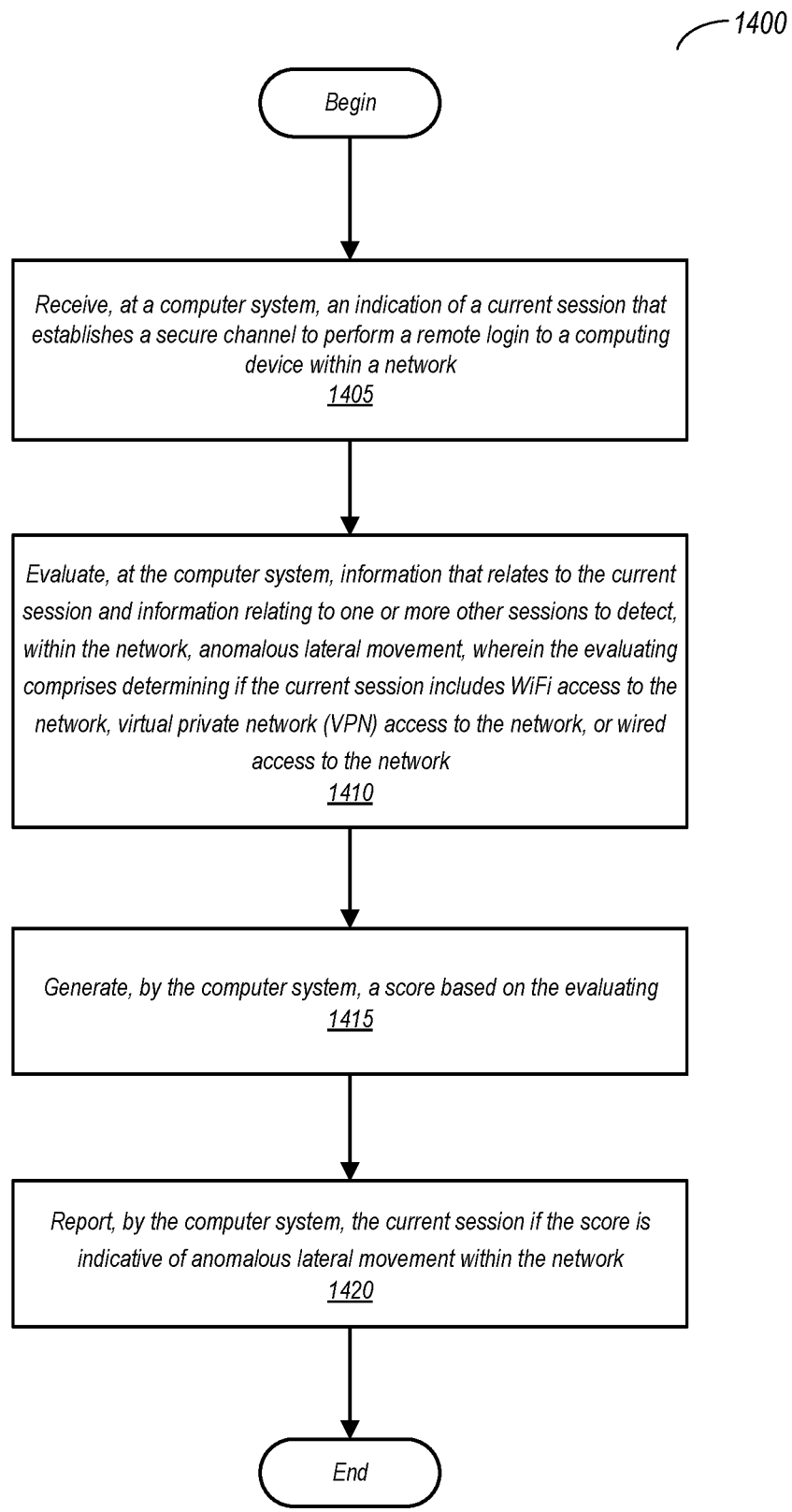
FIG. 14 is a flow diagram illustrating one embodiment of a method for detecting anomalous lateral movement based on detecting a mechanism through which a user establishes a session with the network.

FIG. 14 is a flow diagram illustrating one embodiment of a method for detecting anomalous lateral movement based on detecting a mechanism through which a user establishes a session with the network. Method 1400 may be performed on a computer system in a network such as computer system 140 shown in FIG. 1. The method may, in one embodiment, be carried out by a machine learning model (or sub-model) executed on such a computer system.

Method 1400 includes receiving, at a computer system, an indication of a current session that establishes a secure channel to perform a remote login to a computing device within a network (block 1405). The method further includes evaluating, at the computer system, information that relates to the current session and information relating to one or more other sessions to detect, within the network, anomalous lateral movement, wherein the evaluating comprises determining if the current session includes WiFi access to the network, virtual private network (VPN) access to the network, or wired access to the network (block 1410). Thereafter, the method includes generating, by the computer system, a score based on the evaluating (block 1415) and reporting, by the computer system, the current session if the score is indicative of anomalous lateral movement within the network (block 1420).

Figure 15:
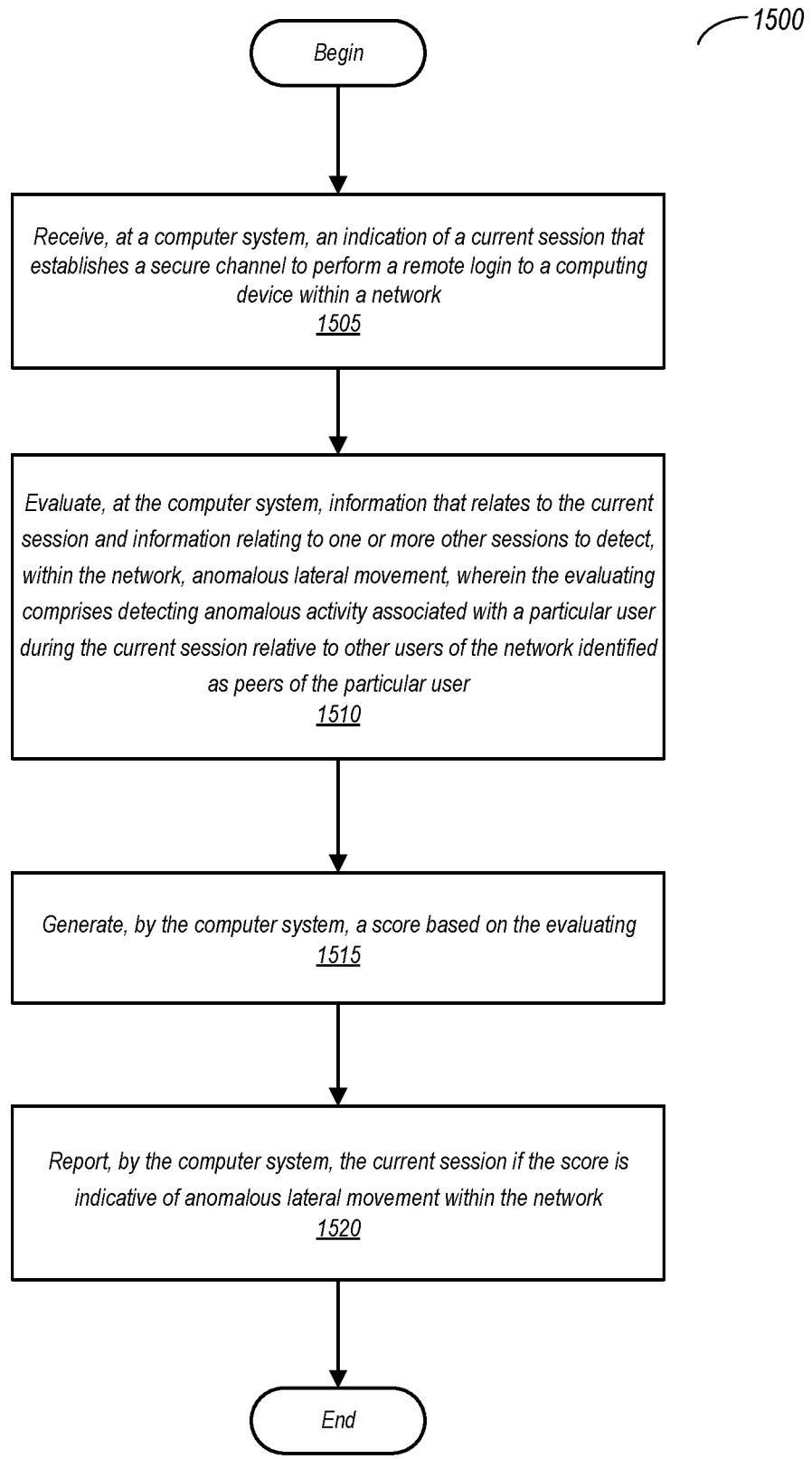
FIG. 15 is a flow diagram illustrating one embodiment of a method for detecting anomalous lateral movement based on comparing session activity with those of peers of a particular user.

FIG. 15 is a flow diagram illustrating one embodiment of a method for detecting anomalous lateral movement based on comparing session activity with those of peers of a particular user. Method 1500 may be performed on a computer system in a network such as computer system 140 shown in FIG. 1. The method may, in one embodiment, be carried out by a machine learning model (or sub-model) executed on such a computer system.

Method 1500 includes receiving, at a computer system, an indication of a current session that establishes a secure channel to perform a remote login to a computing device within a network (block 1505). The method further includes evaluating, at the computer system, information that relates to the current session and information relating to one or more other sessions to detect, within the network, anomalous lateral movement, wherein the evaluating comprises detecting anomalous activity associated with a particular user during the current session relative to other users of the network identified as peers of the particular user (block 1510). Thereafter, the method includes generating, by the computer system, a score based on the evaluating (block 1515) and reporting, by the computer system, the current session if the score is indicative of anomalous lateral movement within the network (block 1520).

Figure 16:
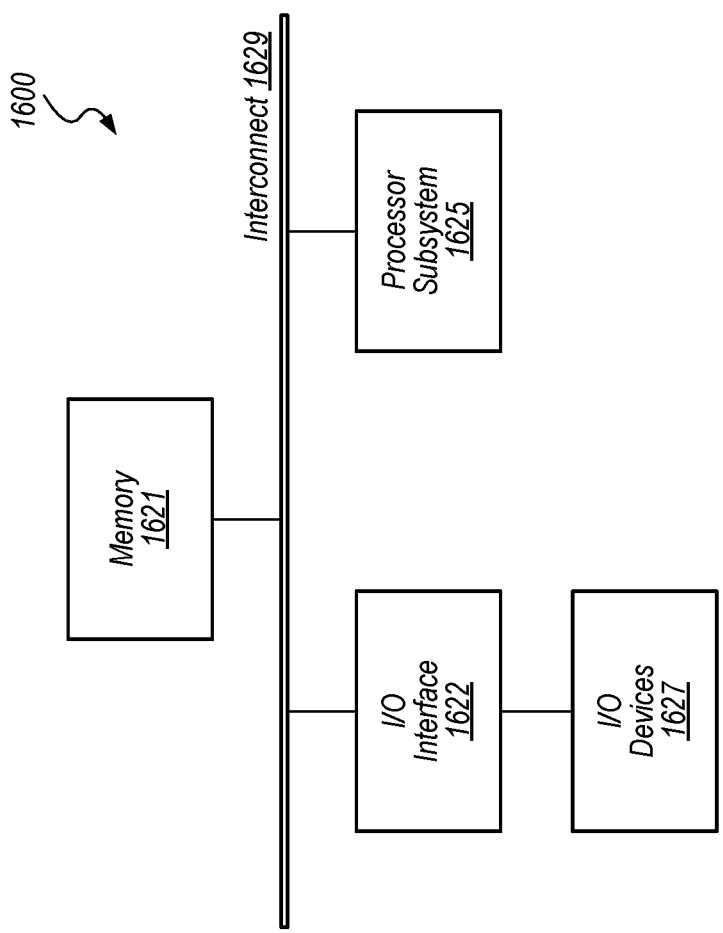
FIG. 16 is a block diagram of one embodiment of an example computer system.

Example Computer System:

FIG. 16 is a block diagram of one embodiment of an example computer system. Instances of computer system 1600 as shown here may be implemented, in various embodiments in various ones of the systems described above and may further be connected to the same network. Among other implementations, computer system 1600 may be configured in a manner similar to, e.g., computer 140 of FIG. 1, and may be used to execute a machine learning model to evaluate network sessions of other users for the possibility of anomalous lateral movement by an attacker.

Computer system 1600 includes a processor subsystem 1625 that is coupled to a system memory 1621 and I/O interface(s) 1622 via an interconnect 1629 (e.g., a system bus). I/O interface(s) 1622 is coupled to one or more I/O devices 1627. Computer system 1600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1600 is shown in FIG. 16 for convenience, computer system 1600 may also be implemented as two or more computer systems operating together.

Processor subsystem 1625 may include one or more processors or processing units. In various embodiments of computer system 1600, multiple instances of processor subsystem 1625 may be coupled to interconnect 1629. In various embodiments, processor subsystem 1625 (or each processor unit within 1625) may contain a cache or other form of on-board memory.

System memory 1621 is usable store program instructions executable by processor subsystem 1625 to cause computer system 1600 perform various operations described herein. System memory 1621 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1600 is not limited to primary storage such as memory 1621. Rather, computer system 1600 may also include other forms of storage such as cache memory in processor subsystem 1625 and secondary storage on I/O Devices 1627 (e.g., a hard drive, storage array, etc.). In some embodiments, these other forms of storage may also store program instructions executable by processor subsystem 1625, including those associated with the machine learning model and its various sub-models discussed above. In various embodiments implemented in accordance with this disclosure, system memory 1621 may store program instructions to implement a machine learning model and various sub-models thereof for the detection of anomalous lateral movement, as described above with reference to FIGS. 1-15.

I/O interfaces 1622 may be any of various types of interfaces configured to couple to and communicate with other devices, according to various embodiments. In one embodiment, I/O interface 1622 is a bridge chip (e.g., Southbridge) from a front-side to one or more back-side buses. I/O interfaces 1622 may be coupled to one or more I/O devices 1627 via one or more corresponding buses or other interfaces. Examples of I/O devices 1627 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1600 is coupled to a network via a network interface device 1627 (e.g., configured to communicate over Wi-Fi, Bluetooth, Ethernet, etc.).

Numerous variations and modifications will become apparent to those skilled in the art once the above disclosure is fully appreciated. It is intended that the following claims be interpreted to embrace all such variations and modifications.

What is claimed is:

1. A method comprising:
  receiving, at a computer system, session information relating to a current session and one or more previous sessions in which a network is accessed by a particular user;
  evaluating, by the computer system, network activity, wherein the evaluating includes:
    a first evaluation of a point of an entry into the network for the current session, wherein the point of entry is a host within the network at which the current session originated, wherein the first evaluation includes generating a prevalence value for the point of entry that is determined by aggregating user activity from different users based on a number and quality of links to the point of entry, and wherein the first evaluation further includes comparing the prevalence value to a threshold; and
    a second evaluation of timing of the current session relative to previous session timing for the particular user, wherein the second evaluation includes determining whether timing information for the current session deviates from timing information for prior sessions of the particular user by comparing previous session times of the particular user with session times of the current session, wherein the previous session times include respective start times and durations of the prior sessions; and
  determining, by the computer system, whether a score based on the evaluating is indicative of whether anomalous lateral movement is present within the network.

2. The method of claim 1, wherein the second evaluation is based on a user profile created using history data in secure shell session (SSH) logs for the particular user.

3. The method of claim 1, wherein the second evaluation is performed by applying principal component analysis on data in a user profile in order to determine timing anomalies for login activities of the particular user.

4. The method of claim 1, wherein the evaluating includes:
  a further evaluation of whether the particular user has an active Wi-Fi or virtual private network (VPN) connection to the network.

5. The method of claim 1, wherein the evaluating includes:
  a further evaluation of whether network activity associated with the particular user is anomalous relative to network activity of other users designated as peers to the particular user.

6. The method of claim 5, wherein the other users are designated as peers to the particular user based on a common job function.

7. The method of claim 5, wherein the other users are designated as peers to the particular user based on historical data.

8. The method of claim 1, wherein the evaluating includes:
  a third evaluation of whether the particular user has an active Wi-Fi or virtual private network (VPN) connection to the network; and
  a fourth evaluation of whether network activity associated with the particular user is anomalous relative to network activity of other users designated as peers to the particular user.

9. A non-transitory, computer-readable medium having program instructions stored thereon that are capable of causing a computing system to implement operations comprising:
  determining that a particular user has a current session active with a computing device of a network;
  evaluating information to detect anomalous lateral movement within the network, wherein the information relates to the current session and one or more additional sessions within the network, and wherein the evaluating includes:
    assessing a point of entry for the current session, wherein the point of entry is a host within the network at which the current session originated, using an algorithm that determines a prevalence of the point of entry relative to other computer systems in the network, wherein determining the prevalence includes assessing paths through the network for each of a plurality of users active during a particular time period, aggregating user path information to generate a prevalence score for the point of entry, and comparing the prevalence score to a threshold value;
    assessing, using history information for the particular user, whether timing information for the current session deviates from timing information for prior sessions of the particular user by comparing previous session times of the particular user with session times of the current session, wherein the previous session times include respective start times and durations of the prior sessions; and determining whether the evaluating is indicative of anomalous lateral movement within the network.

10. The computer-readable medium of claim 9, wherein the history information is based on secure shell (SSH) session logs for the particular user.

11. The computer-readable medium of claim 9, wherein assessing timing of the current session includes performing a principal component analysis algorithm on the history information for the particular user.

12. The computer-readable medium of claim 9, wherein the evaluating further includes assessing behavior of the particular user during the current session.

13. The computer-readable medium of claim 9, wherein the evaluating further includes assessing whether the particular user has an active WiFi or VPN connection to the network.

14. The computer-readable medium of claim 9, wherein the evaluating further includes assessing whether network activity of the particular user is anomalous relative to network activity of peers of the particular user.

15. A method, comprising:
receiving, at a computer system, session information relating to a current session and one or more previous sessions in which a network is accessed;
evaluating, by the computer system, network activity that includes network activity associated with a particular user, wherein the evaluating includes determining a score based on:
a first sub-model that ranks a point of entry for the particular user relative to other network computer systems by generating a prevalence value for the point of entry using user graphs and a population graph that aggregates user activity in the network, wherein the point of entry is a host within the network at which the current session originated; and
a second sub-model that determines whether timing information of the current session deviates from timing information of prior sessions for the particular user by comparing previous session times of the particular user with session times of the current session, wherein the previous session times include respective start times and durations of the prior sessions; and
determining, by the computer system based on the score, whether anomalous lateral movement is present within the network.

16. The method of claim 15, wherein the evaluating further includes using a third sub-model that determines whether permissible network connection types are currently active.

17. The method of claim 16, wherein the permissible network connection types include WiFi and VPN.

18. The method of claim 17, wherein the permissible network connection types are WiFi connection, VPN connection, and wired connection.

19. The method of claim 15, wherein the second sub-model uses history information from secure shell (SSH) logs.

20. The method of claim 15, wherein the evaluating further includes using a fourth sub-model that detects anomalous activity during the current session relative to peers of the particular user.

\* \* \* \* \*